Aug. 23, 1955  E. V. BUNTING  2,715,863
POWER OPERATING SYSTEM FOR TRACTOR HITCH LINKAGES
Filed June 7, 1949  15 Sheets-Sheet 1

INVENTOR.
ERNEST V. BUNTING
BY Carlson, Pitzner,
Hubbard & Wolfe
ATTORNEYS

Aug. 23, 1955     E. V. BUNTING     2,715,863
POWER OPERATING SYSTEM FOR TRACTOR HITCH LINKAGES
Filed June 7, 1949     15 Sheets-Sheet 2

INVENTOR.
ERNEST V. BUNTING
BY Carlson, Pitzner, Hubbard & Wolfe
ATTORNEYS

AUTOMATIC DRAFT
CONTROL LOW
RATIO SETTING

INVENTOR.
ERNEST V. BUNTING

POSITION CONTROL
START OF OPERATION
WITH BREAKOUT
ACTION

INVENTOR.
ERNEST V. BUNTING
BY Carlson, Pitzner,
Hubbard & Wolfe
ATTORNEYS

POSITION CONTROL
OPERATION COMPLETED

INVENTOR.
ERNEST V. BUNTING
BY Carlson, Pitzner,
Hubbard & Wolfe
ATTORNEYS

Aug. 23, 1955     E. V. BUNTING     2,715,863
POWER OPERATING SYSTEM FOR TRACTOR HITCH LINKAGES
Filed June 7, 1949     15 Sheets-Sheet 9

INVENTOR.
ERNEST V. BUNTING
BY Carlson, Pitzner
Hubbard & Wolfe
ATTORNEYS

Aug. 23, 1955 E. V. BUNTING 2,715,863
POWER OPERATING SYSTEM FOR TRACTOR HITCH LINKAGES
Filed June 7, 1949 15 Sheets-Sheet 12

INVENTOR.
ERNEST V. BUNTING
BY Carlson, Pitzner,
Hubbard & Wolfe
ATTORNEYS

Aug. 23, 1955 E. V. BUNTING 2,715,863
POWER OPERATING SYSTEM FOR TRACTOR HITCH LINKAGES
Filed June 7, 1949 15 Sheets-Sheet 13

INVENTOR.
ERNEST V. BUNTING
BY Carlson, Pitzner,
Hubbard & Wolfe
ATTORNEYS

Aug. 23, 1955  E. V. BUNTING  2,715,863
POWER OPERATING SYSTEM FOR TRACTOR HITCH LINKAGES
Filed June 7, 1949  15 Sheets-Sheet 14
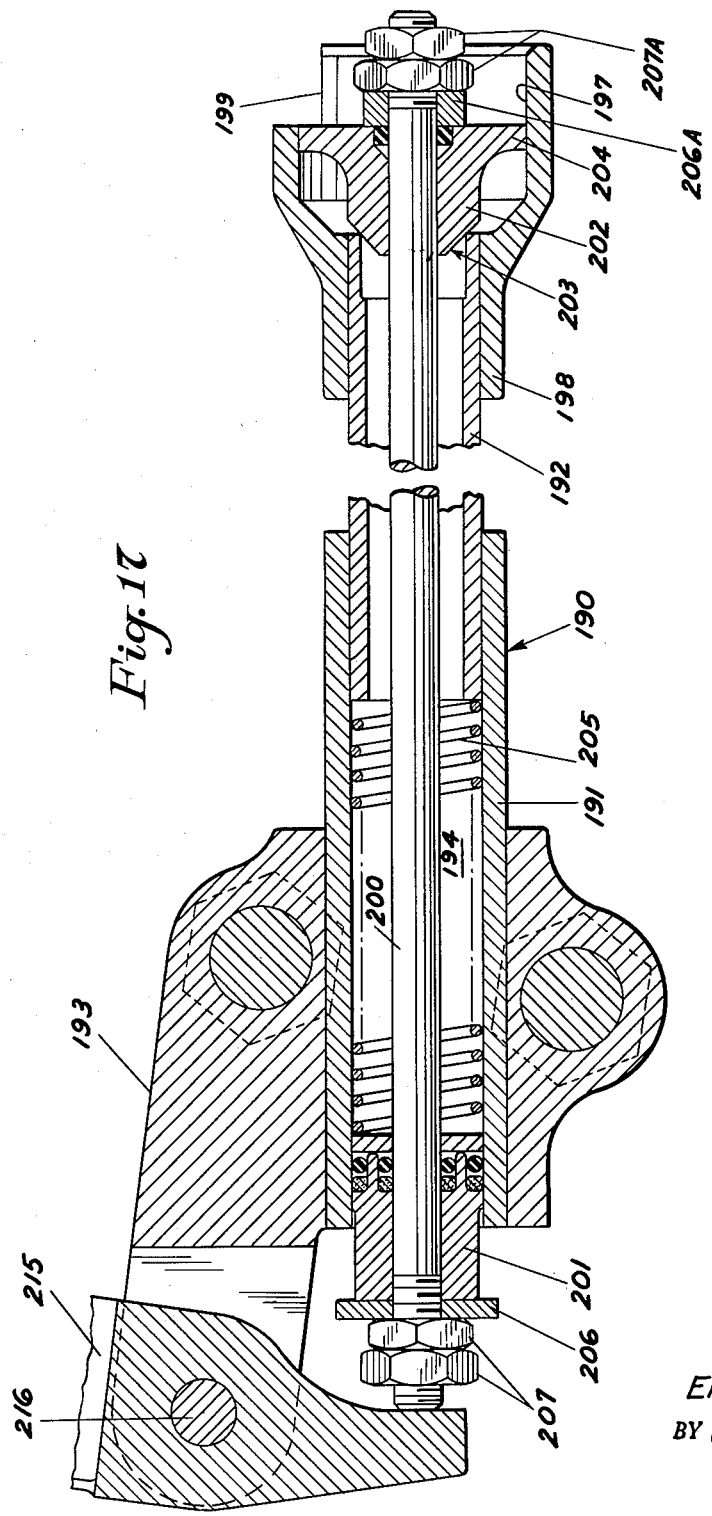
INVENTOR.
ERNEST V. BUNTING
BY Carlson, Pitzner,
Hubbard & Wolfe
ATTORNEYS

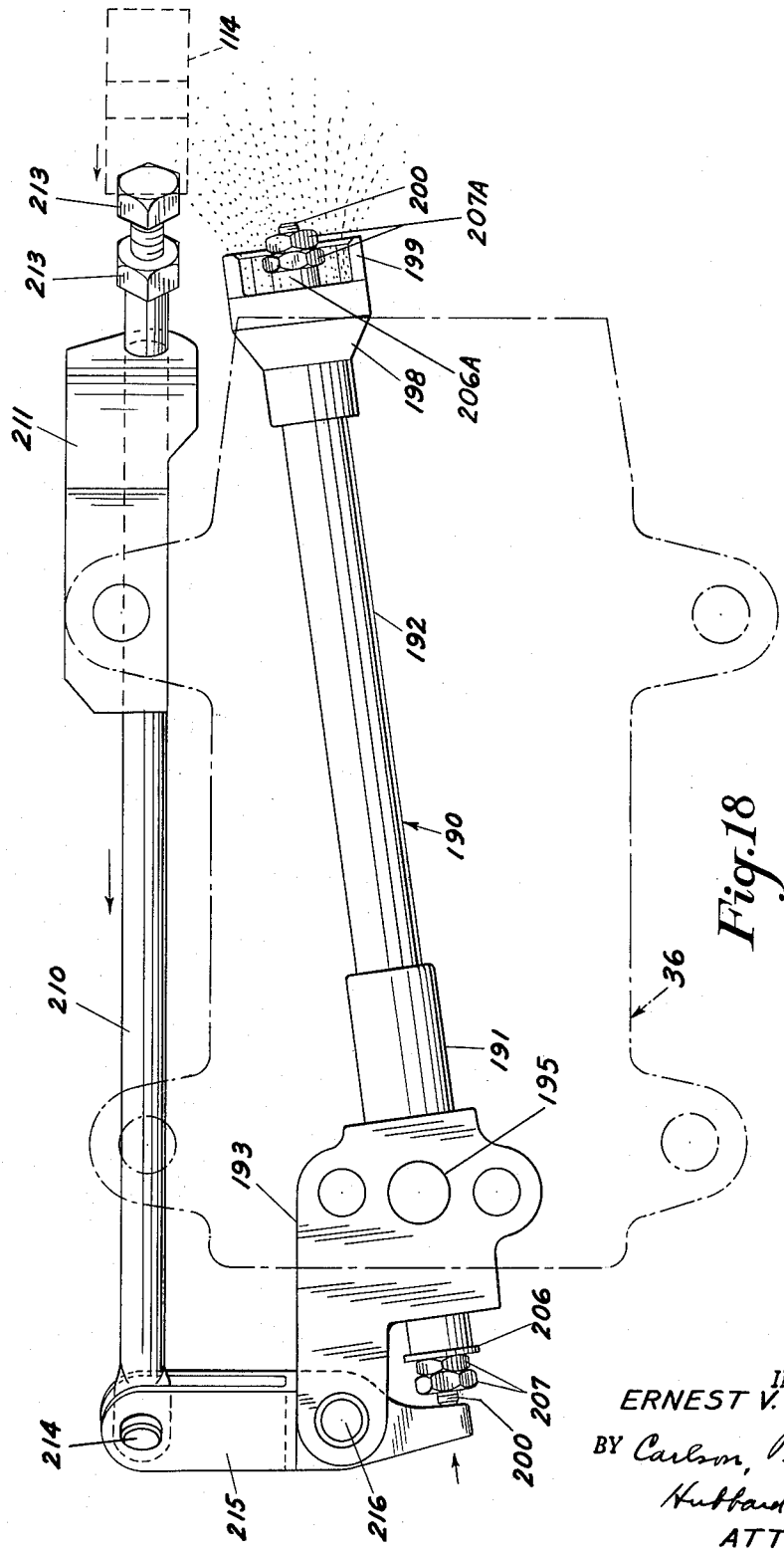

United States Patent Office 2,715,863
Patented Aug. 23, 1955

2,715,863

POWER OPERATING SYSTEM FOR TRACTOR HITCH LINKAGES

Ernest V. Bunting, Detroit, Mich., assignor to Harry Ferguson, Inc., Detroit, Mich., a corporation of Delaware Application June 7, 1949, Serial No. 97,640

28 Claims. (Cl. 97—46.07)

The invention pertains to automatically-controlled power operated systems for tractor hitch linkages, and has for its principal aim the provision in the system of an arrangement for adjusting the sensitivity of the automatic controls.

By "sensitivity" of the system is meant the speed or rapidity with which the system responds to a given change in a controlling force to restore said controlling force to a pre-selected value. Thus, for a given change in the controlling force a highly sensitive system will respond with relatively great rapidity to restore the pre-selected value of the controlling force, while a system having low sensitivity will respond to the same given change slowly, even sluggishly. Also, to produce a given rate of corrective response a highly sensitive system will require only a relatively small change in the magnitude of the pre-selected controlling force, while for a like rate of response a system having low sensitivity will require a substantially greater change in the controlling force.

The basic type of system upon which the present invention is an improvement is disclosed in Ferguson Patent No. 2,118,180, issued May 24, 1938. In that patent is disclosed a power operated system for automatically effecting raising or lowering of a tractor hitch linkage to retain uniformity of draft load on an attached implement at a selected value. By the use of the presently disclosed system it is possible to greatly enhance or enlarge the range of types of implements with which the system may be employed and also to more effectively regulate implement action in accordance with the character of the soil being worked and its surface contour.

With reference to the above aspects of the invention, it will be appreciated that with some types of implements, as for example plows, the system is under extremely heavy load. In such cases a variation of several hundred pounds in the load may be corrected by raising or lowering the plow a relatively short distance. In the case of a cultivator, on the other hand, since it is usually operated in relatively loose soil, a like variation and sometimes even a much smaller variation in the reactive force may require compensating movement of the implement through a much greater distance in order to restore the system to balance. Correct positioning of the implement is further complicated when the tractor has to be driven over a rough or irregular surface, as for example, one presenting alternate ridges and depressions such as may be left by some previous working of the soil. Such irregularities in the surface contour produce a substantial pitching movement of the tractor which, of course, tends to lift or lower the implement with respect to the soil. A proper response of the power operated mechanism is required to maintain the implement within a permissible variation from a selected depth.

With the above in view, the invention has for another of its objects the provision of an improved power operating system in which the sensitivity of the draft responsive controls may be adjusted instantly in accordance with the requirements imposed thereon by the type of implement associated with the hitch linkage, by the character of the soil being worked and by the contour of the surface over which the tractor must be driven in such operation.

A more specific object is to provide improved valve operating mechanism for a hydraulic power operating tractor hitch linkage system, which mechanism is readily adjustable to regulate the extent of movement of the valve in response to any predetermined variation in the draft force imposed on the hitch linkage.

In some instances power operated systems of the general class contemplated may be arranged for selective operation either as "draft control" systems or as "position control" systems. In my application Serial No. 16,904, filed March 25, 1948, I have disclosed an arrangement for such selection or change-over. In the present instance the adjustment of sensitivity which I contemplate is primarily useful during draft control operation. It can, however, also be used during position control. Accordingly, in order to exemplify its maximum utility, I have disclosed herein an application of sensitivity control in an installation where conversion can be made at will to either draft or position control and without interference with, or interference by, the sensitivity adjustments.

It is another object of the invention to improve the mechanism for effecting the conversion from draft to position control or vice versa as well as the mechanisms for carrying out the respective types of control, including simplification of the structure involved to better adapt it for the performance of its intended functions and for commercial production, and to render it simple and safe in operation.

It is also an object of the invention to provide an improved control mechanism in which any preliminary or lost motion of the hand lever is entirely absent when the system is set for position control.

Still another object is to provide improved means for automatically terminating the operation of the power system when the hitch linkage has been raised to transport position.

A further object is to provide improved safety means in the motion-transmitting linkage of the control mechanism effective to prevent damage to the linkage or associated elements in the event that the control lever is actuated too rapidly.

Other objects and advantages of the invention will become apparent as the following description proceeds, taken in connection with the accompanying drawings, in which.

5 showing the power system set for depth control and adjusted for high ratio draft forces.

Figure 6:
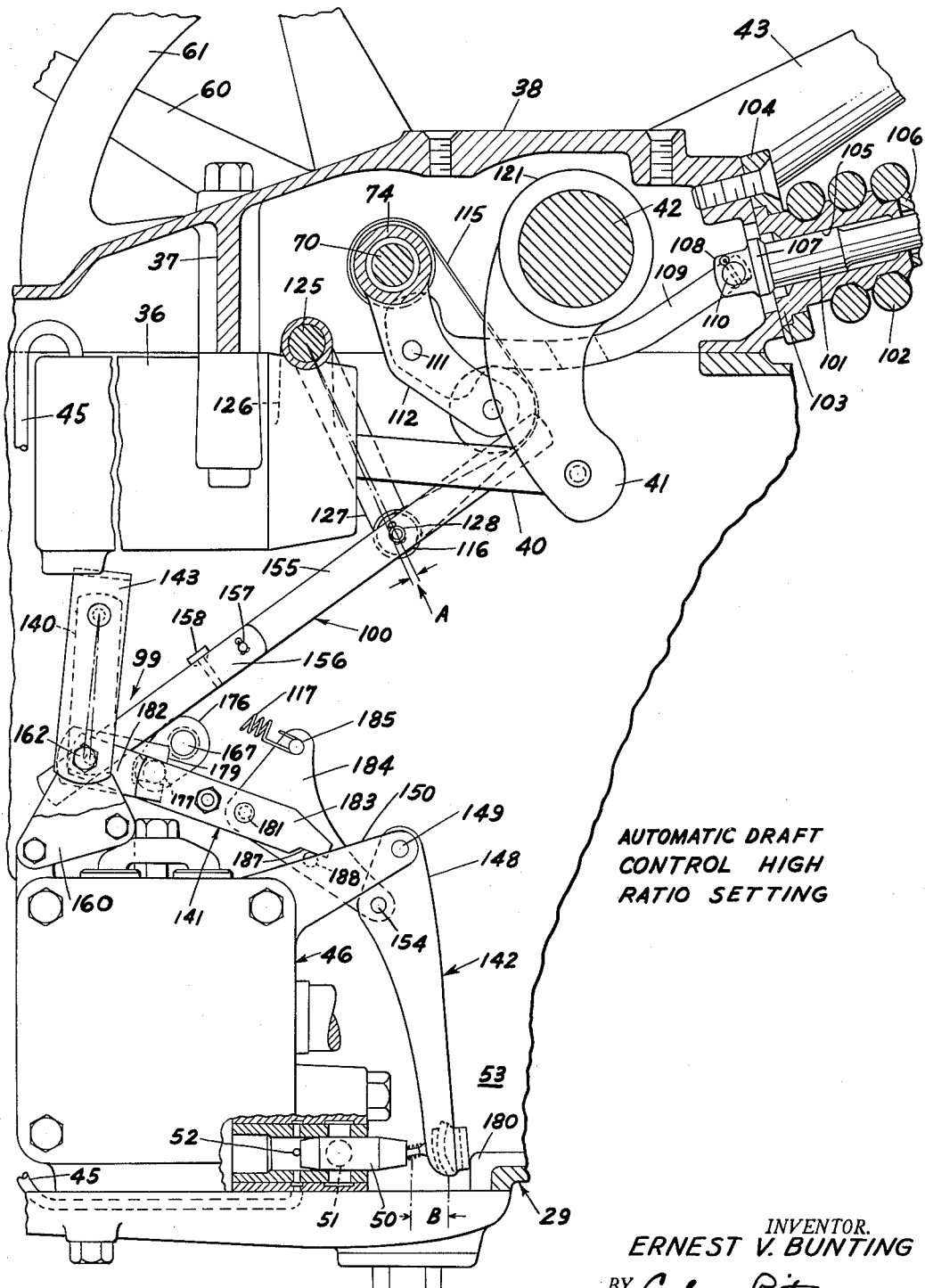
Fig. 6 is a fragmentary sectional view similar to Fig.
Figure 7:
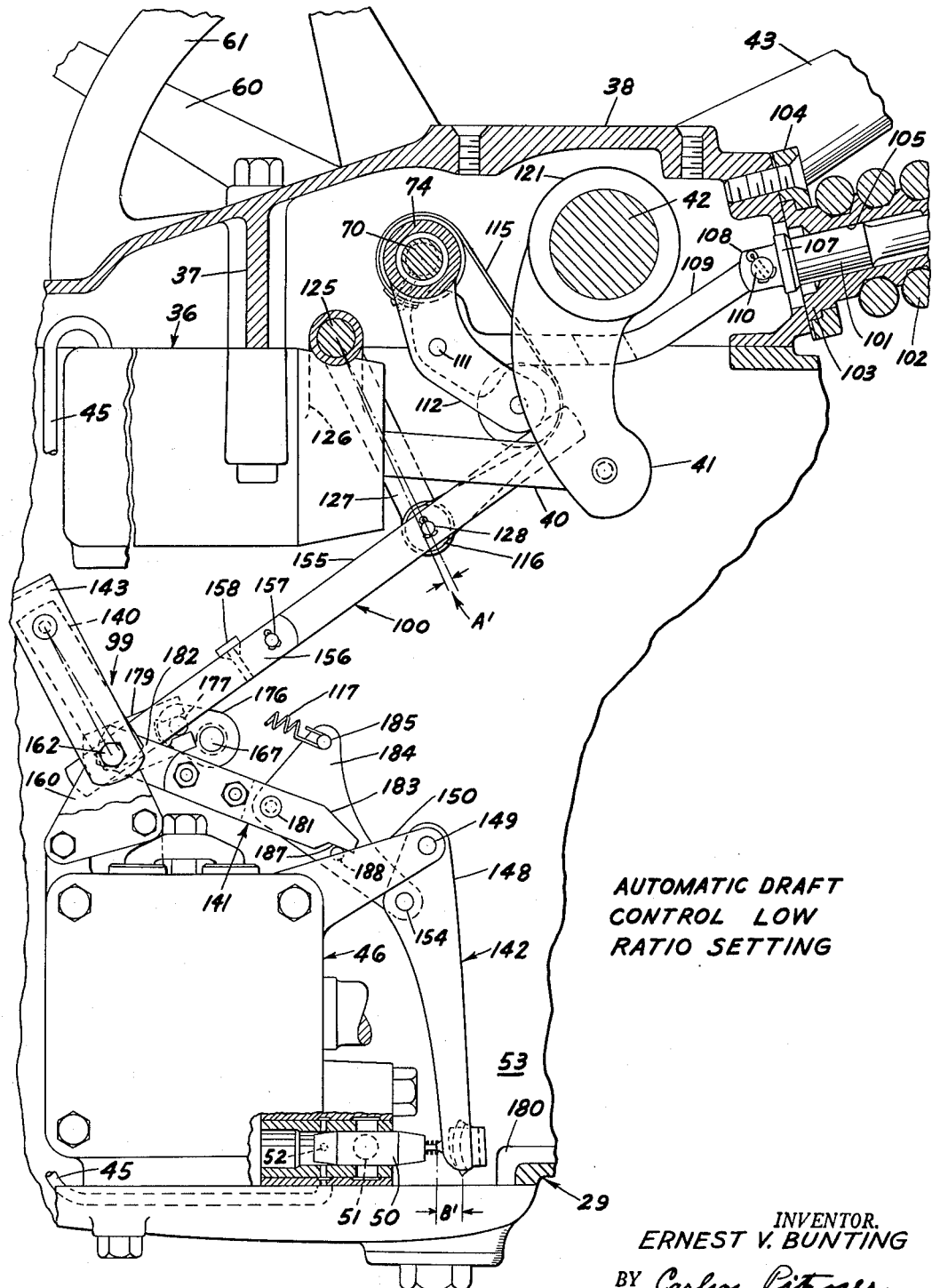

Fig. 7 is a fragmentary sectional view similar to Fig. 6 showing the system set for automatic depth control and adjusted for low ratio draft forces.

Figure 5:
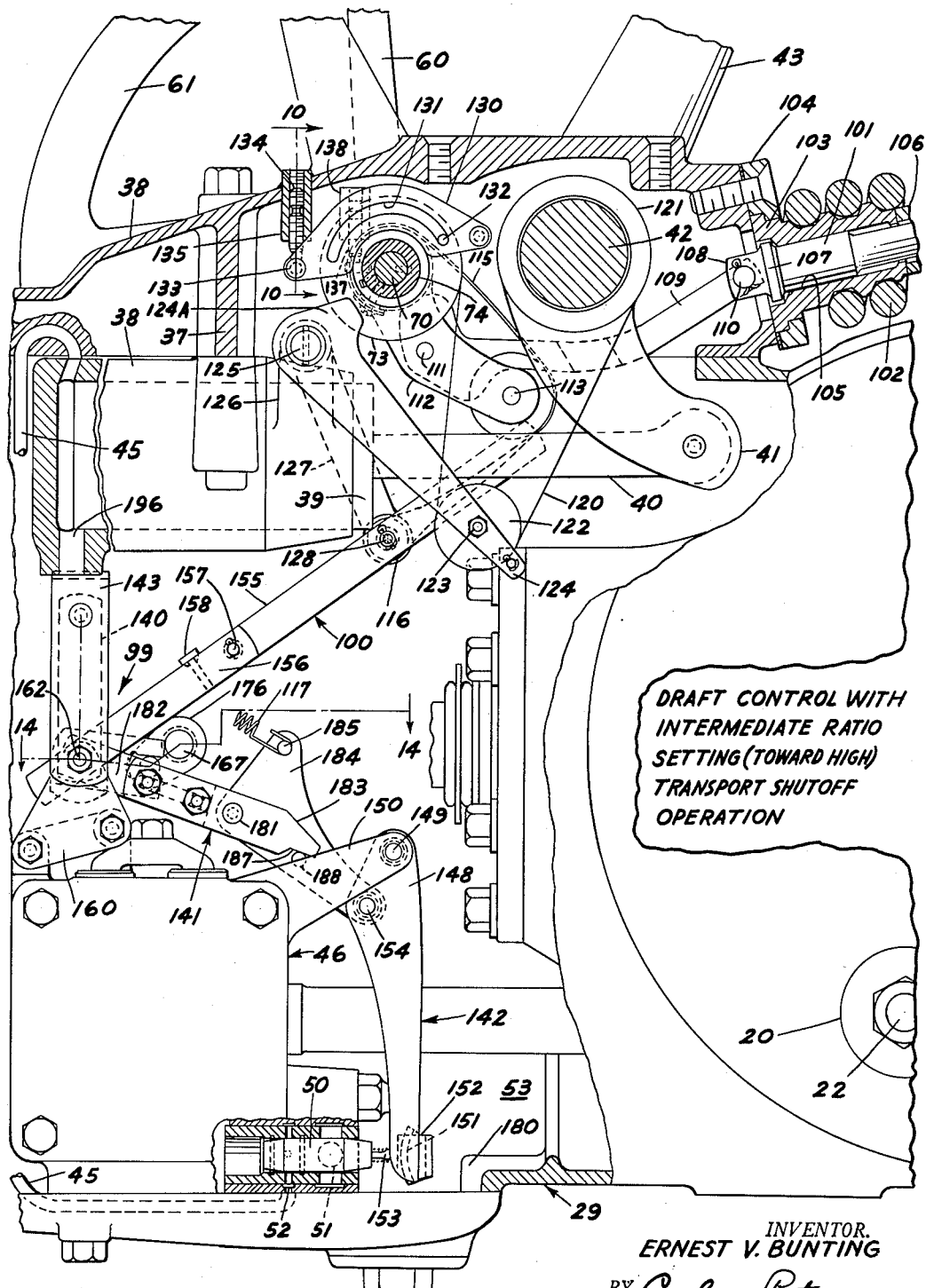
Fig. 5 is a sectional view through the differential housing taken in a vertical plane substantially on the longitudinal axis of the tractor and showing the power operating system conditioned to raise the hitch linkage to transport position.
Figure 8:
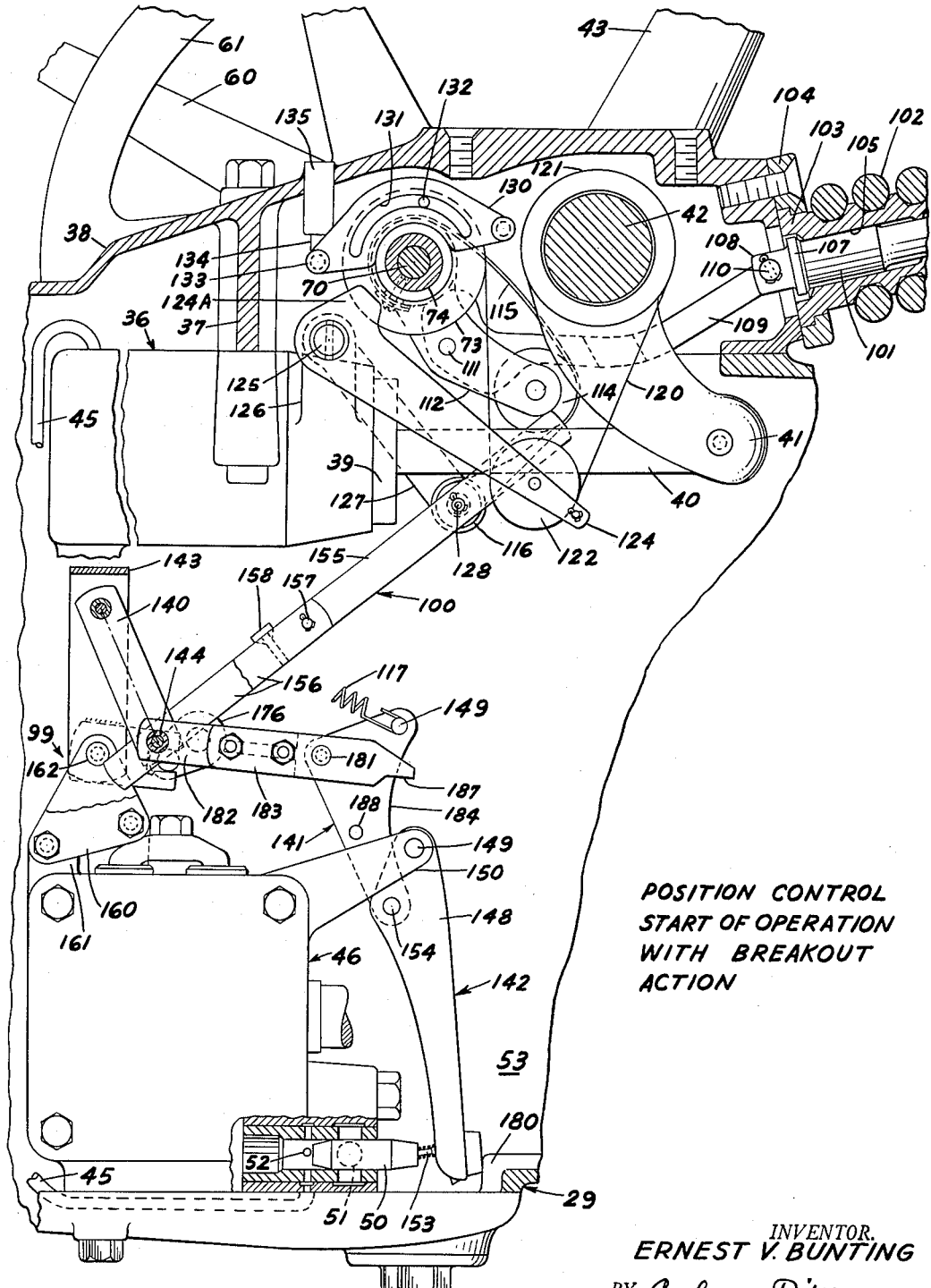

Fig. 8 is a fragmentary sectional view similar to Fig. 5 showing the position of the parts following a too rapid operation of the quadrant lever.

Figure 9:
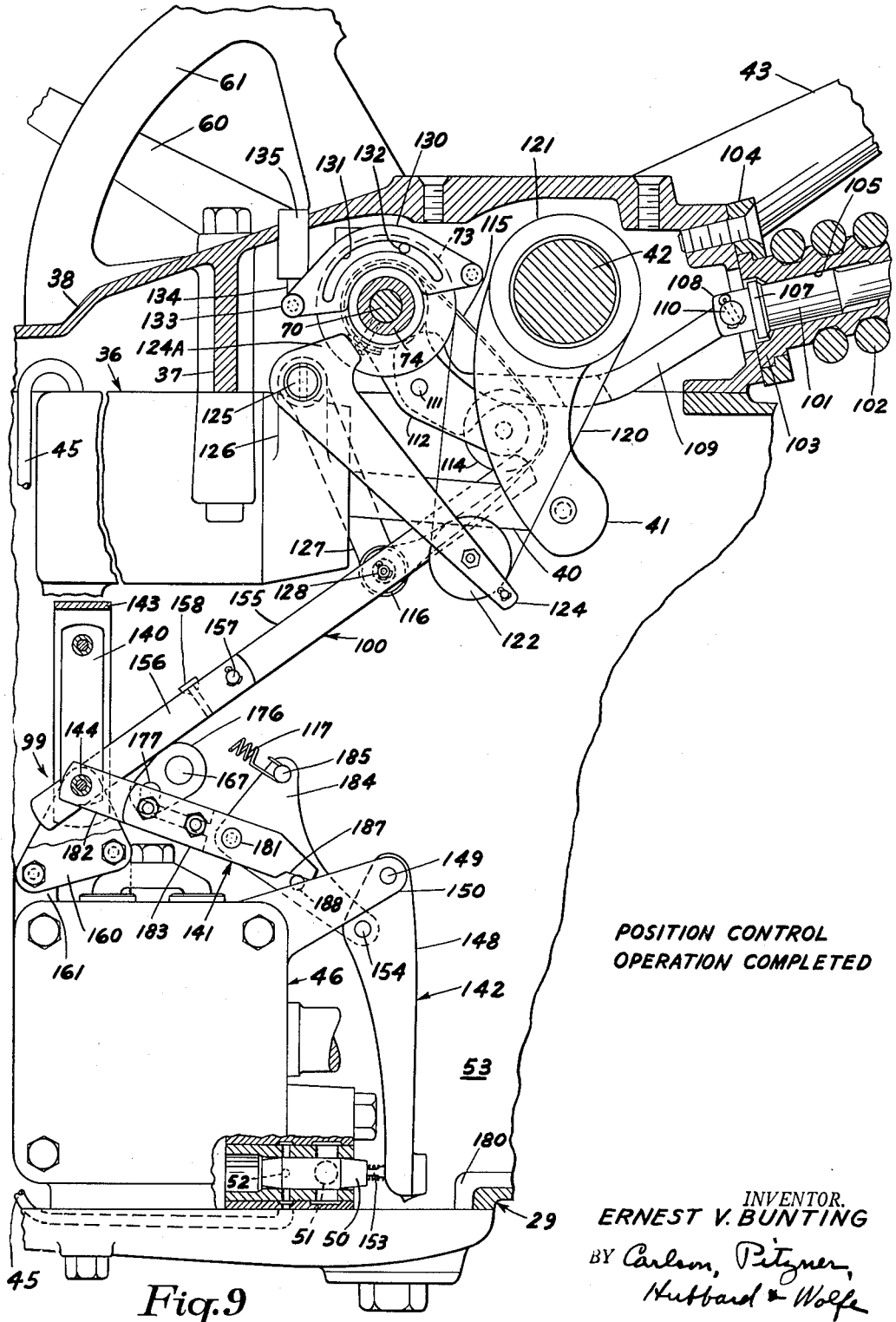

Fig. 9 is a fragmentary sectional view similar to Fig. 5 showing the position stop control mechanism.

Figure 10:
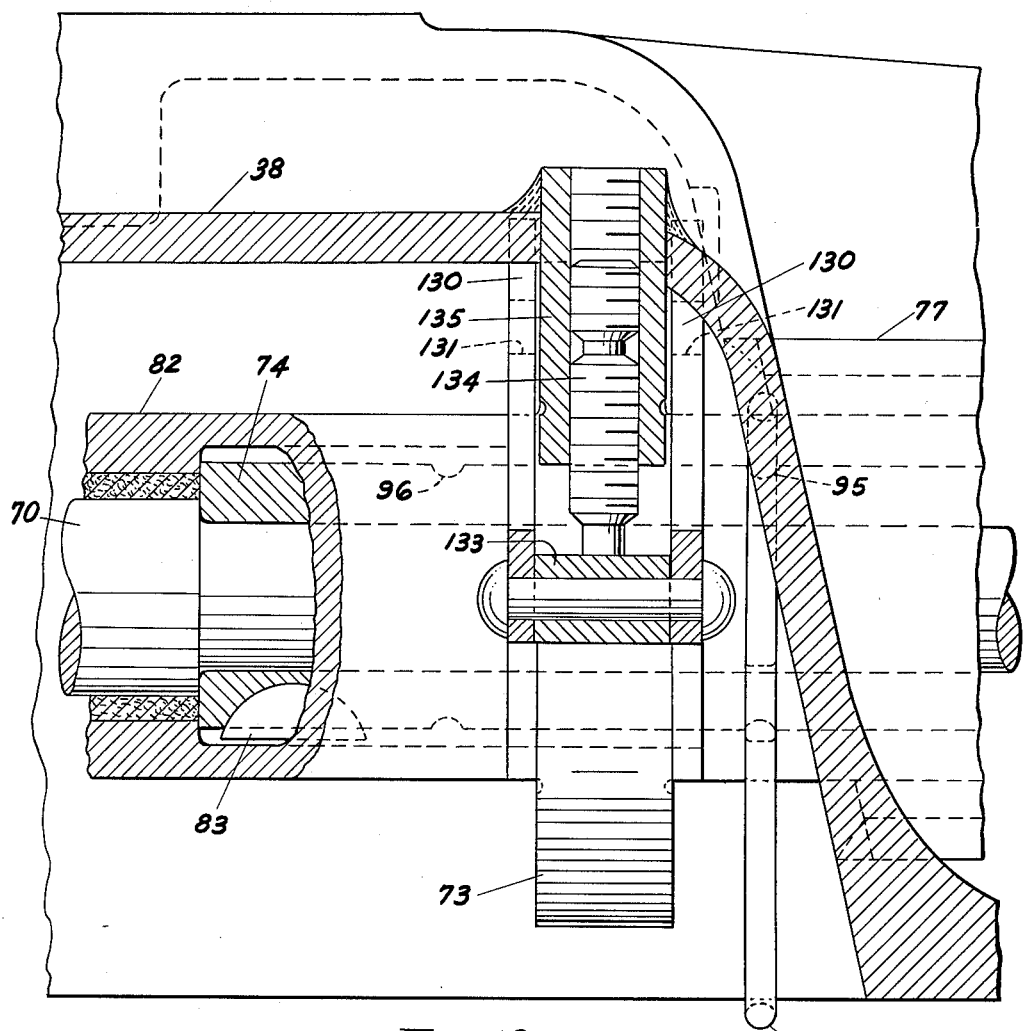

Fig. 10 is a fragmentary sectional view of a part of the position stop control mechanism taken in a vertical plane substantially on the line 10—10 of Fig. 5.

Figure 4:
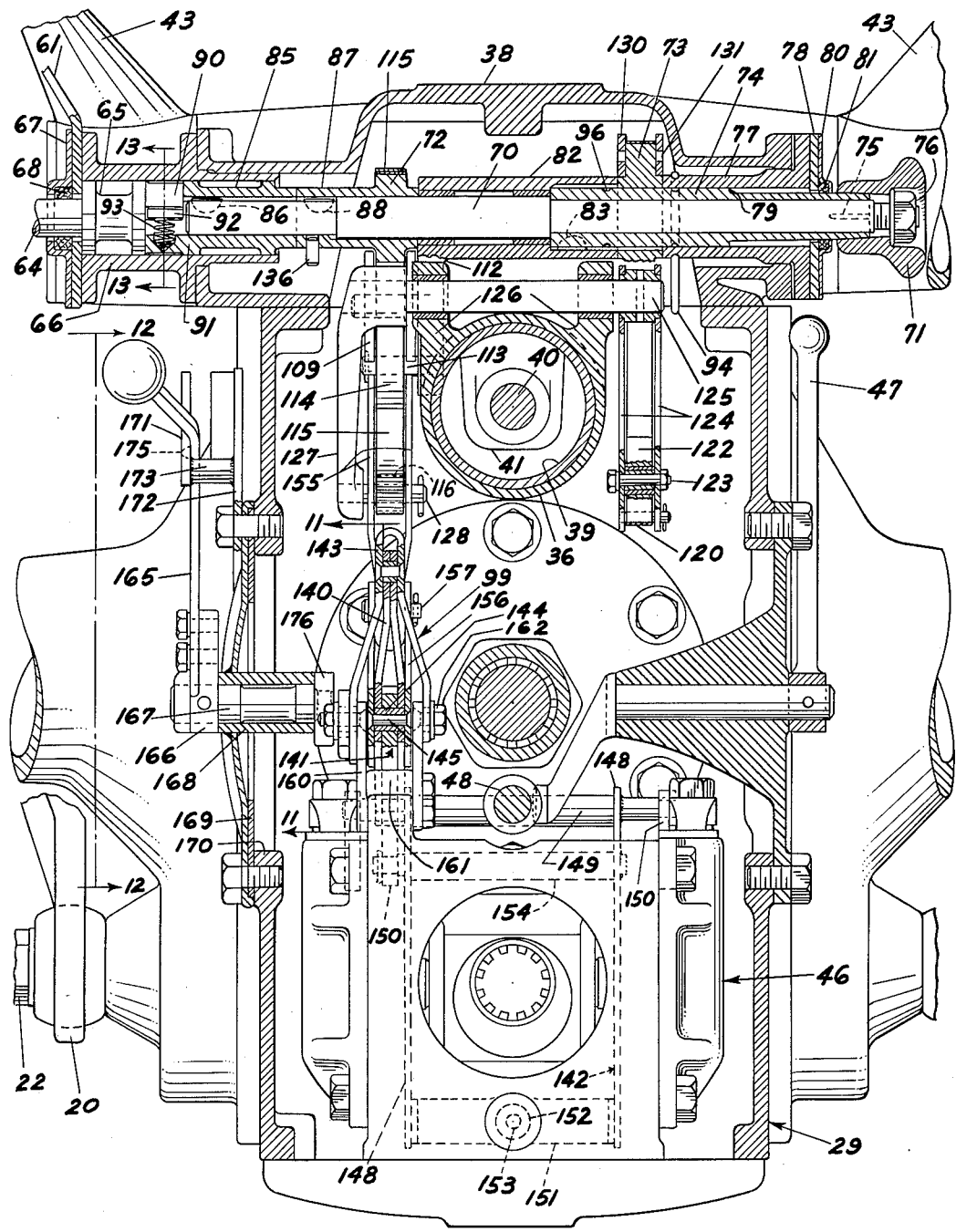
Fig. 4 is a transverse sectional view through the portion of the tractor differential housing enclosing the power operating system taken in a vertical plane substantially on the line 4—4 of Fig. 1.
Figure 11:
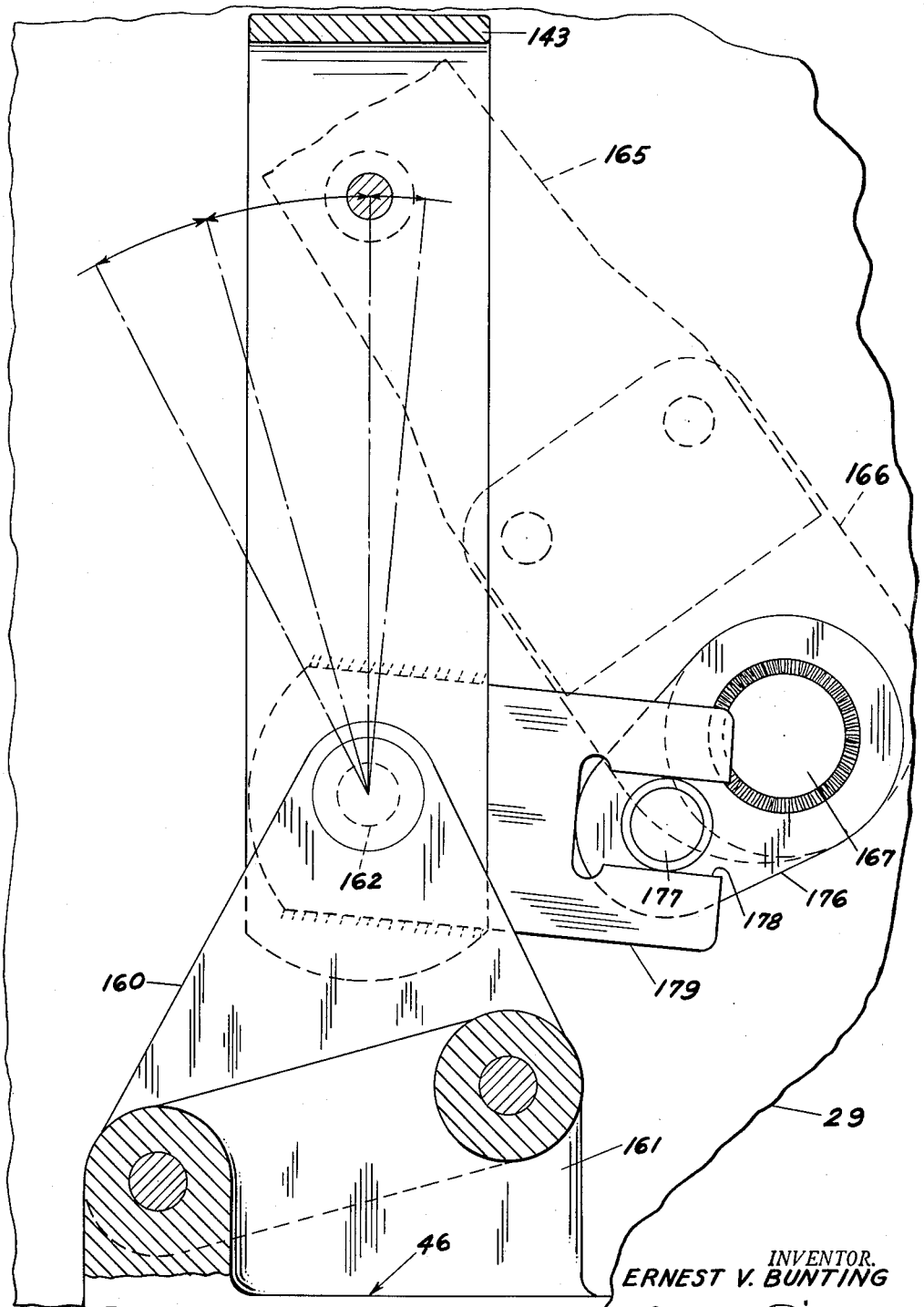

Fig. 11 is a fragmentary sectional view of the sensitivity adjusting mechanism taken in a vertical plane substantially on the line 11—11 of Fig. 4.

Figure 12:
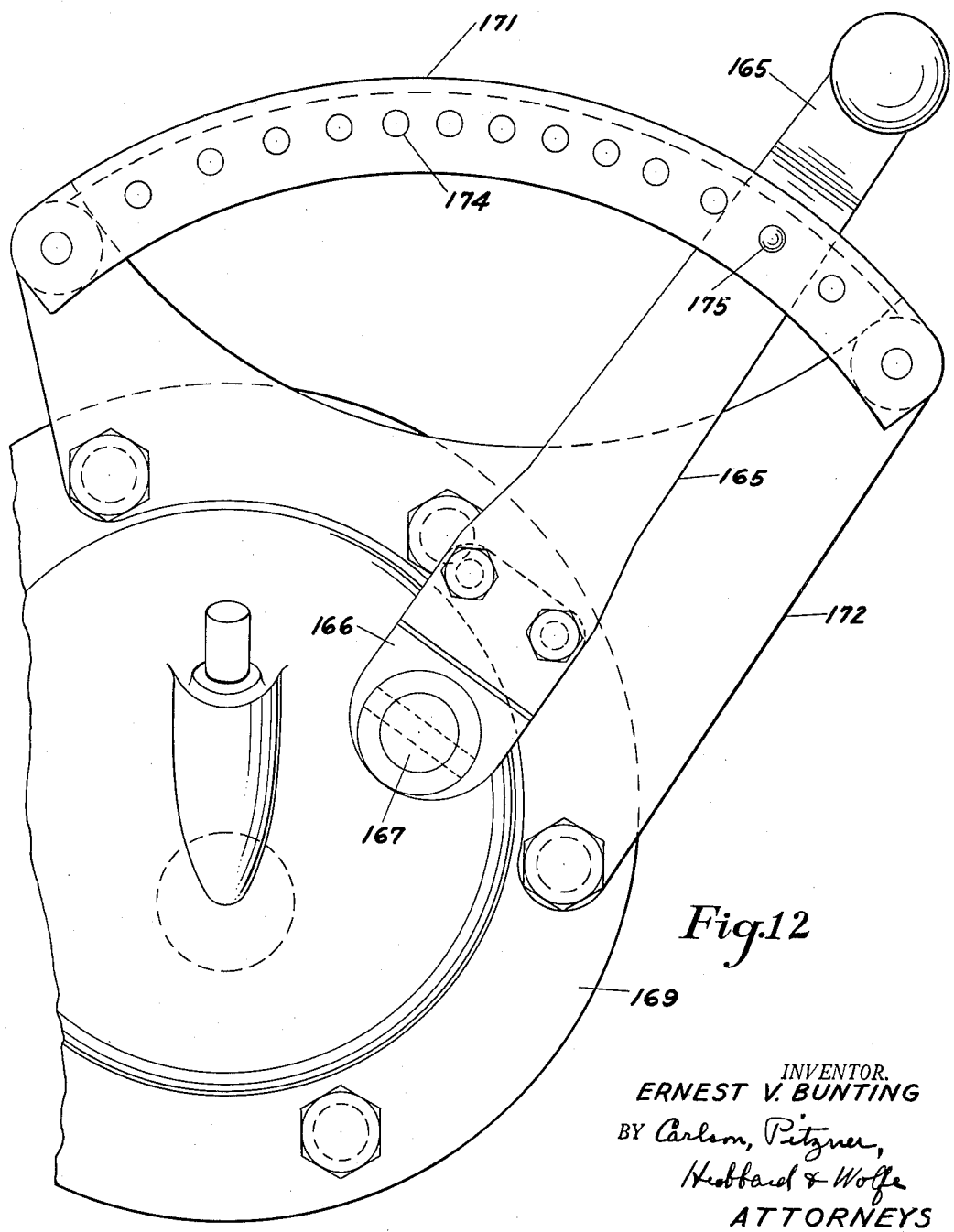

Fig. 12 is a fragmentary side elevational view of the sensitivity control lever taken at one side of a vertical plane substantially on the line 12—12 of Fig. 4.

Figure 13:
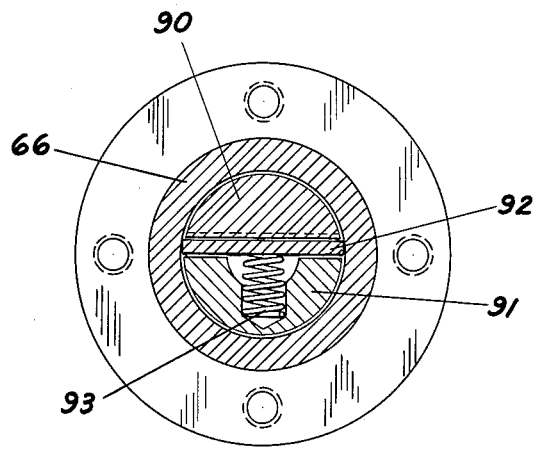

Fig. 13 is a transverse sectional view through the quadrant lever and selector shaft coupling taken in a vertical plane substantially on the line 13—13 of Fig. 4.

Figure 14:
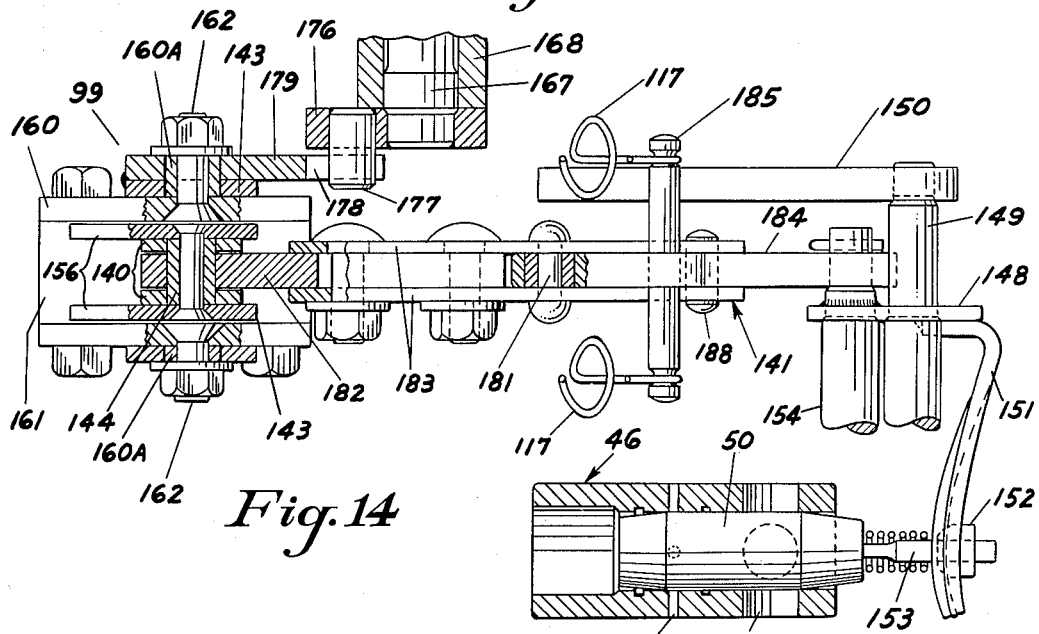

Fig. 14 is a partly sectional fragmentary view of the valve actuating linkage taken in offset generally horizontal planes substantially on the line 14—14 of Fig. 5.

Figure 15:
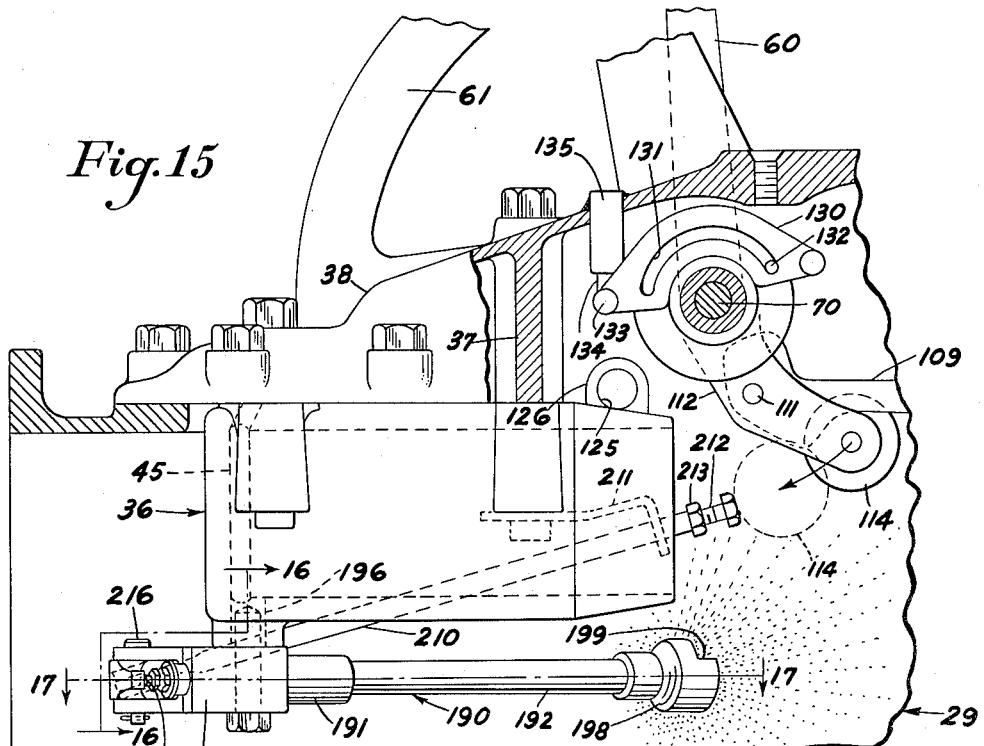

Fig. 15 is a fragmentary vertical sectional view through the upper part of the transmission housing of the tractor, showing the ram cylinder and the overload release mechanism associated therewith.

Figure 16:
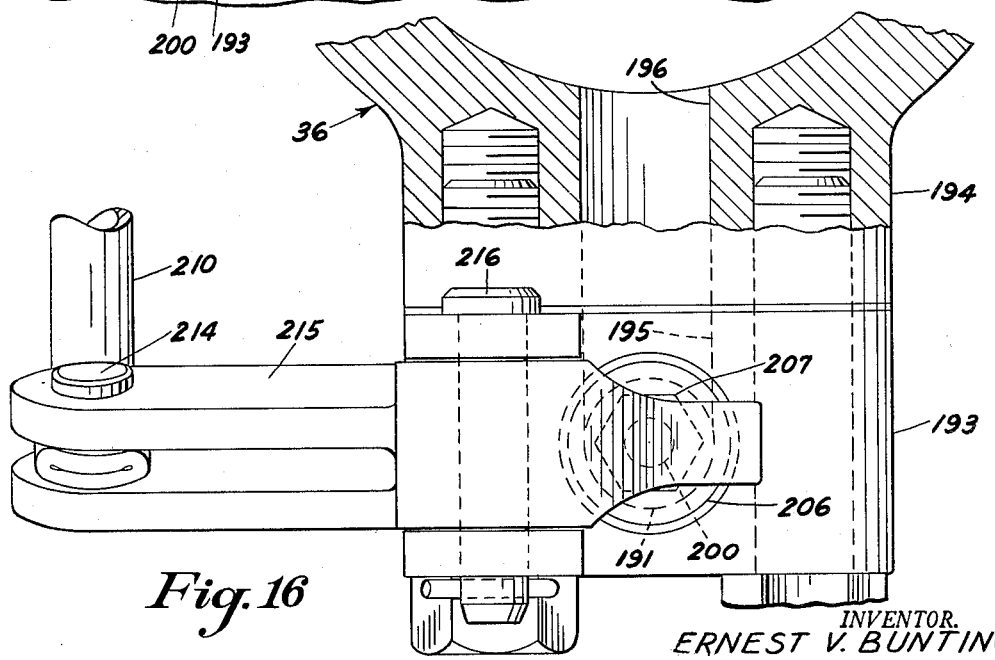

Fig. 16 is a detail view taken in offset planes substantially on line 16—16 of Fig. 15.

Fig. 17 is a longitudinal sectional view of the overload release valve, the left hand portion of the valve being sectioned in a horizontal plane substantially on the line 17—17 of Fig. 15 and the right hand end being sectioned in a plane substantially at right angles to the first plane.

Fig. 18 is a top view of the overload release valve and the associated actuating mechanism.

For purposes of illustration, a single preferred embodiment of the invention has been shown and will be described in detail herein. It is not intended that the detailed character of the disclosure should limit the invention to such particulars. On the contrary, such detailed disclosure is resorted to to afford the greatest aid to the public in later constructing what now appears to be the most desirable form of the invention, but it is intended to cover all modifications and alternative constructions falling within the spirit and scope of the invention as it is more broadly and generally characterized in the appended claims.

The detailed description which follows begins with a preliminary review of the general tractor and hydraulic system installation, proceeds with a description of the manual control devices, then a description of automatic draft and position control operations, and thereafter comes a detailing of the arrangements for adjusting sensitivity and which are integrated into the earlier described mechanisms.

*Tractor and hydraulic mechanism*

Figure 1:
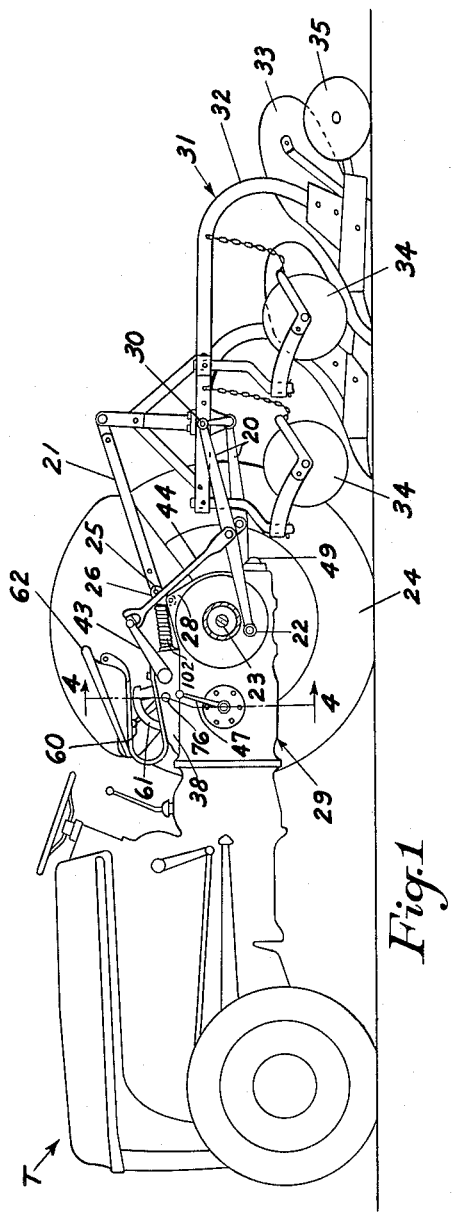
Figure 1 is a side elevational view of a tractor equipped with a power operating system embodying the features of the invention, a typical implement being shown as attached to the hitch linkage which is operated by the power system.

Referring more particularly to the drawings, there is shown in Fig. 1 a lightweight four-wheeled tractor T generally similar to that disclosed in the Henry George Ferguson Patent No. 2,118,180, issued May 24, 1938. At the rear end of the tractor is mounted a hitch linkage of the type shown in that Ferguson patent comprising in this instance a pair of lower hitch links 20 and an upper or top link 21.

The lower hitch links 20 are arranged side by side and converge forwardly. Their front ends are pivotally secured at 22 on the rear end portion of the tractor for vertical swinging movement about a transverse horizontal axis located below and slightly forward of the axis of the rear axle 23 upon which the tractor's pneumatically tired rear traction wheels 24 are mounted. The pivots 22 permit lateral swing of the hitch links 20 as well as vertical swinging movement.

The top link 21 is detachably universally pivoted at its forward end by a removable pin 25 to the rearwardly projecting arm of a rocker or clevis 26 pivoted on a transverse pin 27 (Fig. 2) received in a pair of laterally spaced lugs 28 upstanding from the differential housing 29 at the rear end of the tractor. Forward thrust on the top link 21 tends to swing the rocker 26 forward, while tension on the top link tends to pull it rearward.

Swivelly mounted balls 30 are also provided at the rear ends of the three hitch links 20 and 21, such balls being centrally apertured to receive removable connecting pins. By this means any desired ground working or other implement may be detachably connected to the hitch linkage. In the present instance and simply by way of example, the attached implement has been shown as a two-bottom moldboard plow 31. Its general construction will be familiar to those skilled in the art. Suffice it to note that it has beams 32 which carry two plow bases 33 with coulters 34 and a rolling disk or furrow wheel arrangement 35 similar to that shown in the Henry George Ferguson Patent No. 2,195,515.

Raising of the lower hitch links 20 is accomplished by power operated means, in this instance a hydraulic power unit on the tractor, such unit being preferably enclosed within the center housing 29 of the tractor just forward of the differential. The power unit includes an actuator herein shown as a one-way ram comprising a cylinder 36 (Figs. 3, 5–9 and 15) bolted or otherwise removably secured, as at 37 (Fig. 15) to a removable cover plate 38 which forms a part of the top wall of the housing 29. The cylinder 36 opens to the rear of the tractor and working therein is a piston 39 (Fig. 4) having a piston rod 40 (Fig. 5) which projects rearwardly. The ball-shaped outer end of the piston rod 40 is received in the socketed lower end of an arm 41 rigid with a transverse rockshaft 42 journaled in the upper rear portion of the cover plate 38.

Figure 2:
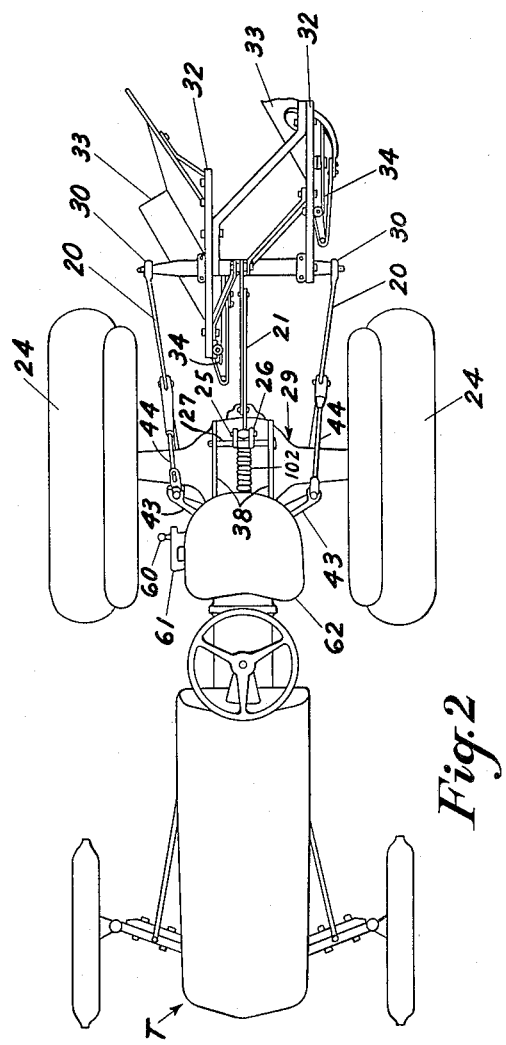
Fig. 2 is a partial plan view of the tractor and implement shown in Fig. 1.

Rigidly secured to opposite ends of the rockshaft 42, as by a splined connection, are two upwardly and rearwardly extending crank arms 43 connected to respective ones of the lower hitch links 20 by means of drop links 44 (see Figs. 1 and 2). With this arrangement the admission of pressure fluid to the forward end of the cylinder 36 forces the piston 39 rearwardly to rock the crank arms 43 upwardly and thereby raise the lower hitch links 20. Upon exhaust of fluid from the cylinder 36, the piston 39 is permitted to retreat into the cylinder under the urging of the gravity load on the hitch links and any implement attached to those links so that the latter swing downward in a lowering direction.

Pressure fluid such as oil is supplied to the actuator or ram cylinder 36 by way of a conduit 45 from a pump 46 (Figs. 3 and 5–9) powered from the tractor engine. The pump may be of any preferred type, such for example as the eccentric driver, multiple cylinder pump shown in the Ferguson Patent No. 2,118,180. A hand lever 47 (Fig. 4) journaled on the housing 29 is operable to move a shifter fork 48 for engaging or disengaging the drive connection from the engine to the pump 46 and power take-off 49 (Fig. 1) at the rear end of the tractor. Reference may be had to the Henry George Ferguson U. S. Patent No. 2,223,002 for a detailed description of a comparable structure.

Supply of fluid to and exhaust of fluid from the ram cylinder 36 for raising and lowering the hitch linkage is desirably controlled by means of a valve mechanism associated with the intake side of the pump so that the pump may be driven continuously without recirculating fluid during idle periods of the system. In the exemplary system, the valve mechanism as shown in Figs. 5–9 and 14 includes a single sliding valve plunger 50 arranged to control a set of intake ports 51 for the pump 46 and a set of restricted bleed or drop ports 52 communicating with the conduit 45 leading to the ram cylinder 36.

In its neutral or "off" position, as shown in Fig. 5, the valve plunger 50 blocks both the intake ports 51 and the bleed ports 52. Under such condition any fluid in the ram cylinder 36 is locked therein and no additional fluid can reach the pump 46 for supply to the ram. Upon forward movement of the valve plunger 50 to its "raising" position (to the left as viewed in Fig. 5), the pump intake ports 51 are uncovered admitting fluid to the pump from a surrounding sump or reservoir 53. The fluid thus admitted to the pump is delivered under pressure to the ram cylinder 36 by way of the duct 45. In this position the valve plunger 50 continues to block the bleed ports 52.

When the valve plunger 50 is shifted rearwardly or to its "lowering" position (Fig. 6) the intake ports 51 are blocked but the bleed ports 52 are uncovered, thereby permitting fluid to exhaust from the ram cylinder to the sump 53. The restricted size of the ports 52 limits the rate at which fluid may escape and thus safely limits the rate of descent for the hitch linkage and the attached implement.

It will be observed that whereas the central portion of the valve plunger 50 is cylindrical in form for a sufficient portion of its length to effect blocking of both sets of ports 51, 52 when the plunger is in mid position, that the end portions of the plunger are, however, slightly tapered. This taper is a factor influencing the progressive change in throttling of the fluid which occurs upon shift of the plunger in either direction from mid or neutral position. In its mid position the plunger affords an infinite restriction (i. e., complete blocking) of fluid from both the intake and exhaust connections. Shift of the plunger in either direction from that mid position results in a progressive diminishment of fluid-throttling for either intake or exhaust, as the case may be. The proportion of port area uncovered and the variable clearance of the plunger from the port face accommodated by the tapered shape both contribute to the degree of throttling. And in the case of either intake or exhaust, the rate of the corresponding rise or fall of the hitch links is controlled by the degree of throttling imposed on the fluid.

*Manual controls*

Manual operation of the control valve plunger 50 is effected by means of a hand lever 60 pivoted to swing over a guide plate or quadrant 61 located in a convenient position alongside the driver's seat 62. In the present instance provision is made for associating this lever selectively with draft control and position control mechanisms so that it can be used for actuating of the control valve when the system is set for either type of operation. Thus when the system is set for draft control the lever 60 is operable to adjust the value of the draft force to be automatically maintained by the system. Likewise, when the system is set for position control the lever is operable to determine the precise position of the lower hitch links.

In the exemplary system the lever 60, which may be conveniently called the quadrant lever, is secured on the reduced outer end portion 64 of a short shaft 65 (Fig. 4) journaled in a bearing bushing 66 secured to the side of the cover plate 38. As herein shown, the quadrant 61 is secured between the outer end of the bushing 66 and a cover plate 67 which is apertured for the passage of the shaft portion 64 and which is formed with a recess for the reception of a packing ring 68 effective to seal the bushing against the entry of dirt.

Change-over from automatic draft control to position control is effected by means of a selector shaft 70 supported on the tractor housing in axial alignment with the quadrant shaft 65 for rotation thereby and for endwise sliding movement relative thereto. In the present instance these shafts are located adjacent the upper part of the cover plate 38 somewhat forwardly of and parallel to the link actuating rockshaft 42. The selector shaft 70 has one end projecting from the side of the housing and is fitted with a knob 71 by which endwise selecting movements are imparted thereto. Such movements are effective to drivingly couple the shaft alternately with control elements 72 and 73 which respectively form parts of the draft control and the position control mechanisms.

As will be seen by reference to Fig. 4 of the drawings, the outer end portion of the shaft 70 which is of reduced diameter is fitted with an elongated sleeve 74, the extreme end portion of which is tapered slightly and slotted longitudinally as at 75 for engagement with a tapered socket formed in the knob 71. A nut 76 threaded on the end of the shaft 70 and bearing against an internal shoulder formed in the knob urges the latter axially of the shaft and serves to clamp the end portion of the sleeve 74 in tight engagement with the shaft so that the parts function as a unitary structure.

The sleeve 74 is supported for rotation and for axial sliding movement in a flanged bearing bushing 77 secured to the side wall of the cover plate 38. An annular stop plate 78 secured over the outer end of the bushing cooperates with a circumferential shoulder 79 on the sleeve to limit the outward movement of the sleeve and selector shaft assembly. A cover plate 80 fitted with a packing ring 81 closes the end of the bushing and seals the same against the entry of foreign matter.

The control element 73 which is herein shown as a flat-faced pulley or sheave is journaled on the sleeve 74 and is confined against axial movement between the inner end of the bushing 77 and opposed end of a hub 82 forming a part of a rocker member to be described later, which is rotatably supported on the intermediate portion of the shaft 70. The driving connection between the selector shaft assembly and the sheave 73 is effected by means of a key 83 adapted to enter a keyway in the sheave when the shaft assembly is shifted to the right from the position in which it is shown in Fig. 4. In the position illustrated, the key 83 is received within a counterbore in the hub 82 and the sheave 73 is thus rotatable relative to the shaft.

The other end of the shaft 70, which is also of reduced diameter, is slidably received within a tubular extension shaft 85 to which the shaft is non-rotatably fixed by a key 86. The control element 72, which in this instance is shown as a flat-faced pulley or sheave with an elongated hub 87 extending at one side, is mounted on the shaft 70 and confined against endwise movement between the adjacent ends of the hub 82 and the extension shaft 85. With the shaft in the position shown in Fig. 4, a driving connection with the sheave 72 is provided by a key 88 engaging in a keyway in the hub portion of the sheave. The shifting of the shaft to its alternate position, that is to the right, withdraws the key 88 from the cooperating keyway in the sheave, thus freeing the latter for rotation relative to the shaft. In this position the key is received within an enlarged bore provided for the enlarged intermediate portion of the shaft.

The extension shaft 85 as shown in Fig. 4 is rotatably received in the bearing bushing 66 which supports the quadrant shaft 65. Provision is made for connecting these shafts for conjoint rotation, such connection including locking means for retaining the quadrant shaft in positions of rotational adjustment without interfering with the reselection of position by means of the quadrant lever. For this purpose the quadrant shaft 65 has on its inner end an axially projecting segmental tang 90 (Figs. 4 and 13) whose flat face is located in a plane offset at one side of the axis of the shaft. This tang overlies a similar segmental tang 91 formed on the end of the extension shaft 85. The flat surface of the tang 91 is located substantially in a common plane with the axis of the two shafts, thus leaving a space between the two tangs. Within this space is a flat key 92 which is urged transversely of the shaft axis toward the face of the tang 90 by a spring 93 seated in a recess in the opposed face of the tang 91. The key 92 is dimensioned lengthwise so as to fit snugly but with some slight clearance in the bushing 66 when disposed substantially diametrically thereof and the spring 93 thus tends to urge it from such position and wedge it in the bushing. Any torque applied through the selector shaft 70 tends to increase the wedging action, thus effectually preventing rotation of either the selector shaft or the quadrant lever shaft by reason of the torque applied to the selector shaft. Rotation of the quadrant shaft by means of the hand lever 60 however tends to shift the key 92 against the action of the spring 93, thus relieving the wedging action and permitting unrestrained rotation of both shafts.

Provision is also made for releasably retaining the selector shaft in either the draft or position control setting. As herein shown this means comprises a hairpin type spring 94 (Fig. 10) inserted in a circumferential groove in the bushing 77 which groove is cut deep enough at one side of the bushing so as to expose the sleeve 74 and allow the spring to bear against the same. Circumferential locating grooves 95 and 96 are spaced apart axially of the sleeve so as to receive the spring as the shaft is moved into the respective draft and position control settings.

Operative association of the selector shaft 70 with one or the other of the control elements 72 or 73 brings into action either the automatic draft control mechanism or the position control mechanism and in effect constitutes the quadrant lever 60 a part of the activated mechanism. In either case, the mechanism operates through an actuating means or linkage 99 (Fig. 5) to position the valve plunger 50 for effectuating the desired type of control. This linkage embodies novel features of construction and functions in a novel manner to be described in detail hereinafter, but for present purposes it will be sufficient to note that it includes an elongated operating member or link 100 disposed between the selector shaft assembly and the pump 46 for movement endwise in a path inclined upwardly and rearwardly with respect to the tractor housing.

Automatic draft control

Automatic draft control is effected by the quadrant lever 60 and associated control mechanism in cooperation with a draft responsive device including an element 101 and means for moving said element in accordance with the application to said device of a force corresponding in magnitude and sense to the sum of the moments acting on the implement attached to the hitch linkage and tending to rock the implement fore and aft about the linkage. The element 101 is thus adapted to be displaced proportionately to changes in the draft load or horizontal resistance to movement imposed on an implement attached to the hitch linkage. While the present power system is adapted for use with various types of draft responsive devices, it has been shown herein in association with a device of the type disclosed and claimed in my copending application Serial No. 16,904, filed March 25, 1948, now abandoned. As set forth in the above application, this draft responsive device affords numerous advantages over previous devices since it is adapted to respond to draft forces which place the top hitch link either under compression or under tension as contrasted with the basic draft control system of the Ferguson Patent No. 2,118,180 in which the draft responsive element is displaced only when the top hitch link is under compression. The particular device shown has advantages over that disclosed in the Chambers and Bunting Patent No. 2,437,875, issued March 16, 1948, in respect of its ease of adjustment, its greater stability and its more accurate responses, particularly at the point where the force on the top link changes from tension to compression, or vice versa.

In the presently disclosed system the draft control device is comprised in an assembly mounted on the cover plate 38 for cooperation with the top hitch link 21. Included in this assembly is the draft responsive element 101, herein shown as an elongated plunger. Movement of this plunger is resisted in either direction from a central position by a helical control spring 102 within which it is supported for axial sliding movement. As herein shown, the spring 102 is fixedly attached at one end to the cover plate 38 and at the other end bears on an arm of the rocker 26 to which the top link 21 is pivoted. For attachment to the cover plate 38 the spring 102 is threaded in helical grooves in a flanged plug 103 secured to a machined face on the cover plate 38 by a retaining ring 104 is screwed to such housing.

The other end of the spring 102 is similarly anchored to a rear plug (not shown) which is suitably secured to the rocker arm. Accordingly, there is no looseness or play in the spring connections so that when the rocker arm is swung rearwardly upon application of tension to the top link 21, the control spring 102 is immediately stressed in tension from its central or neutral position, and conversely when the rocker arm is swung forward by a compressive force on the top link, the control spring is immediately stressed in compression. There is therefore no loss of control due to the spring.

The control plunger 101 is rigidly attached to the rear plug in well known manner and is slidably received in an axial bore 105 in the front plug 103 so that it may shift axially with reference to the latter plug in response to tensioning or compression of the control spring. Overtravel of the plunger during compression of the control spring is prevented by a sleeve or bushing 106 encircling the same and interposed between the opposing faces of the plug 103 and companion plug. Overtravel of the control plunger in an outward direction upon application of tension to the control spring is prevented by a head 107 on the inner end thereof abutting against a shoulder in the counterbored inner end of the plug 103. In the "central" or "neutral" position of the plunger 101, the front end of the head 107 is disposed substantially flush with the rear face of the plug 103.

At its forward end the plunger 101 is formed with laterally spaced ears 108 (Figs. 5–9) between which is received the end of a member 109 which is pivotally secured to the ears by a pin 110 and is forked at its forward end. The intermediate portion of the forked member 109 is offset downwardly, in this instance to clear the rockshaft 42, and the forward or forked end thereof is pivotally secured by a pin 111 to an arm 112 integral with and depending from the rocker hub 82. This arm is located at the end of the rocker member adjacent the sheave 72 on the selector shaft and the arm carries at its outer end a pin 113 rotatably supporting a flat-faced pulley or sheave 114 in alinement with the sheave 72. The forked end of the member 109 is shaped so as to straddle the sheaves 72 and 114 and thus insure their accurate alinement at all times.

A thin flat flexible band 115 of steel or other suitable material is anchored at both ends to the sheave 72 and after passing over the sheave 114 is looped about an evener sheave 116 mounted on the link 100. As described in detail hereinafter, the link is yieldably urged in a forward direction by springs 117 to the extent permitted by the band 115. Accordingly, the position of the link may be changed either by rotation of the sheave 72 to wind up or pay out the band 115 or by rocking of the arm 112 to shift the sheave 114 forwardly or rearwardly.

In the exemplary system the arrangement is such that the swinging of the quadrant lever 60 from the raised or transport position in which it is shown in Fig. 5 toward the lowering position shown in Fig. 6 serves to rock the selector shaft 70 and sheave 72 in a direction to wind up the band 115 on the sheave, thus pulling the link 100 rearwardly. Through the medium of the linkage 99 of which the link 100 forms a part, such rearward movement of the link is effective to shift the valve plunger 50 outwardly to vent the ram cylinder and allow the lower hitch link and implement to move downwardly. Conversely, when the quadrant lever 60, selector shaft 70 and depth control sheave 72 are rocked in the opposite direction or toward the "raised" position, the band 115 is unwound from the sheave permitting the link 100 to move forwardly and downwardly under the action of the spring 117. The valve plunger 50 is accordingly shifted forwardly to a position to open the valve ports 51 and thereby effect delivery of pressure fluid to the ram cylinder. The position 39 is thus shifted rearwardly in the cylinder to actuate the rockshaft 42 and raise the lower hitch links and the implement attached thereto.

Corresponding movements are imparted to the actuating mechanism by axial movements of the control spring plunger 101 through the medium of the forked member 109, arm 112 and sheave 114. Thus when the plunger is shifted forwardly in response to a compressive force on the top link 21, the crank arm and sheave 114 are rocked forwardly, allowing the actuating member to advance and shift the valve plunger 50 to a position for supplying pressure fluid to the ram cylinder so as to lift the lower hitch links. Upon movement of the control spring plunger in the opposite direction, as upon the diminution of an applied compressive force or upon application of tension to the top link 21, the link 100 is drawn rearwardly and upwardly to shift the valve plunger into a position for venting the ram cylinder.

It will thus be seen that through the connection provided by the band 115, the quadrant lever 60 is effective to select a set position of the valve plunger 50 for a particular draft force and any variation in that force as reflected by the movement of the control plunger 101 will modify the position of the valve so as to cause a lifting or lowering of the hitch links and the attached implement until the horizontal resistance imposed on the implement corresponds to the selected draft force. It will be understood, of course, that when a condition of equilibrium is attained, that is, when the force of the control spring corresponds to the force for which the quadrant lever is set, the valve plunger will occupy its neutral position to completely block communication with the ram cylinder and thus lock the lower links 20 in a fixed position against downward movement.

*Position control*

In "position" control the lower hitch links 20 have a follow-up action with reference to the quadrant lever, that is, the power-operating system positions the links precisely in accordance with the position of the quadrant lever and raises or lowers them in accordance with corresponding movements of the lever. Position control has previously been incorporated in power-operating systems for tractor hitch linkages, as for example, in the systems disclosed in my earlier applications Serial No. 712,125, now Patent No. 2,632,628, and Serial No. 16,904. In general those systems employ cam mechanism actuated in unison with the rise and fall of the hitch linkage for automatically restoring the control valve to neutral position when the system reaches a control point established by the position of the quadrant lever.

The position-control mechanism disclosed herein performs that same general function, but embodies novel features of construction which afford structural simplicity and compactness, which facilitate manufacture and installation. Moreover, the presently disclosed system eliminates any need for lost motion in the connection between the quadrant lever 60 and the valve actuating linkage 99. Consequently, the mechanism provides immediate response of the control valve 50 upon movement of the quadrant lever from transport position as compared with the delayed action heretofore obtaining under those conditions.

In accordance with the invention, position control is effected in accordance with the rise and fall of the lower hitch links 20 as reflected by the position of the power-operated rockshaft 42. The position of the rockshaft is coordinated with the position of the quadrant lever and selector shaft assembly through the medium of a narrow flexible band 120 (Figs. 3, 5, 8 and 9) of steel or other suitable material anchored at one end to the position-control element or sheave 73 and at the other end to a sleeve 121 mounted on and rotatable with the shaft 42. The band 120 is looped over an evener sheave 122 rotatably supported by a pin 123 between a pair of laterally spaced lever arms 124 constituting a part of a torsion rod and lever assembly.

The lever arms 124 are rigidly secured at one end to a torsion rod or shaft 125 which is rotatably supported in bearings carried by lugs 126 upstanding from the ram cylinder 36 adjacent its rear end. The location of the shaft 125 and arms 124 is such that the evener sheave 122 is alined with the position-control sheave 73. Laterally projecting ears 124ª provided on the respective arms extend over and engage opposite end faces of the sheave 73 to maintain such alinement. Fixed on the other end of the shaft 125 is a lever arm 127 connected at its free end by a pin 128 with the link 100. In the particular organization illustrated the pin 128 serves additionally to support the draft control evener sheave 116.

When the position control sheave 73 is operatively associated with the selector shaft 70, swinging of the quadrant lever 60 from the raised position (Fig. 5) toward the lowering position (Fig. 6) acts to wind up the band 120 on the sheave. The shortening of the band tends to draw the evener sheave 122 upwardly, thereby rocking the torsion rod assembly counterclockwise as viewed in Fig. 5 and shifting the link 100 rearwardly and upwardly. As explained heretofore, such movement of the link 100 is effective to impart an outward movement to the valve plunger 50 and assuming that the plunger was in the neutral position at the beginning of the movement of the quadrant lever, the shifting of the link 100 will position the plunger for venting the ram cylinder. As fluid is exhausted from the ram cylinder, the rockshaft 42 is turned in a counterclockwise direction to lower the hitch links 20 and at the same time the band 120 is unwound from the rockshaft. Such unwinding will allow the torsion rod assembly to swing clockwise with the link 100, thereby tending to return the valve plunger to the neutral position. The arrangement is such that the valve will arrive at the neutral position and interrupt the exhaust of fluid from the cylinder and thus the lowering of the hitch links as soon as the rockshaft catches up with the quadrant lever and selector shaft. In other words, the power rockshaft follows precisely the movements of the quadrant lever so that the lower hitch links 20 are stopped in a position corresponding with the position of the quadrant lever.

The follow-up movements of the power rockshaft are the same when the quadrant lever 60 is swung from a lowered toward the raised position. Such upward movement of the quadrant lever unwinds the band 120 from the sheave 73, thus permitting movement of the link 100 forwardly and downwardly to shift the valve plunger 50 in a direction effective to admit pressure fluid to the ram cylinder. The ram responds by swinging the rockshaft 42 in a direction to raise the hitch links and in its movement the band is wound on the sleeve 121 until the position of equilibrium is reached. At this point, or in other words, when the hitch links 20 have been raised to the precise position indicated by the quadrant lever 60, the valve plunger is positioned to block the ram cylinder against the ingress or egress of pressure fluid.

Transport shut-off

Provision is made for utilizing the position control mechanism for shutting off the hydraulic system when the linkage is raised to transport position irrespective of whether the system is set for draft control or position control. This is advantageous where a double-acting control spring is provided in the draft responsive means, as in such cases the position of the plunger 101 may vary substantially when different implements are attached to the linkage.

When the selector shaft is set for position control, the position control mechanism operates in the normal manner above described to restore the valve plunger 50 to neutral position when the hitch linkage arrives at the transport position upon movement of the quadrant lever 60 to its upper limit position. At this time the draft control sheave 72 is disconnected from the selector shaft, leaving the flexible band 115 more or less slack so as to avoid interference with the movements of the link 100.

When the selector shaft is set for draft control, the sheave 73 is disengaged from the selector shaft and the sheave 72 is engaged therewith, thereby transferring control to the flexible band 115 and leaving the band 120 slack. Upon movement of the quadrant lever 60 to its uppermost position with the selector shaft set for draft control, the power rockshaft 42 is rocked counterclockwise so as to impart a lifting movement to the lower hitch links 20. In this movement the band 120 is wound up on the sleeve 121, thus progressively shortening the loop around the evener sheave 122 and tending to rotate the sheave 73 clockwise relative to the selector shaft. To condition the position control mechanism to function for transport cutoff under these conditions, a limit stop is provided for the position control sheave 73 so as to define a fixed anchorage point for the position control band 120. Accordingly, when the sheave reaches this stop position the continued winding of the band around the rockshaft shortens the loop of the band 120 and draws the link 100 rearwardly to shift the valve plunger 50 to neutral position.

The limit stop provided in the present instance includes a pair of segmental plates 130 supported for free rotation about the selector shaft 70. These plates are mounted on opposite sides of the position-control sheave 73 and are provided with similarly disposed arcuate slots 131 for the reception of a pin 132 extending through the sheave. The arrangement is such that the plates are picked up by the pin and rotated with the sheave 73 as the rockshaft 42 and lower hitch links approach the transport position. The plates are connected at opposite ends by cross members 133, one of which is positioned for engagement with a stop screw 134 threaded through a sleeve element 135 fixed in the upper wall of the tractor housing (Figs. 3–5 and 10). By turning the screw in or out the cutoff position can be accurately adjusted.

Provision is also made for defining the limit position of the draft selector sheave 72 in the transport position. For this purpose the sheave is provided with a laterally projecting pin 136 (Figs. 3 and 4) adapted to coact with a stop screw 137 threaded through a sleeve 138 rigidly fixed on the upper wall of the transmission housing. It will be apparent that the two stop screws 134 and 137 provide convenient reference points whereby the selector shaft 70 and the sheaves 72 and 73 may be lined up for proper engagement of the respective keys in their associated keyways. Moreover, it will be apparent that the power system will be effectively shut off when the lower hitch links and implement reach the transport position irrespective of the shifting of the selector shaft.

Valve actuating linkage and sensitivity control

In accordance with the invention, the sensitivity control heretofore referred to is incorporated in the motion transmitting linkage 99 by which the valve plunger is positioned in either draft or position control. More specifically, the linkage is constructed and arranged so that it may be adjusted to vary the extent of movement of the valve plunger 50 in response to any given movement of the control element initiating the movement. While this adjustment is available in either type of control, it finds its greatest utility in automatic draft control wherein the valve plunger 50 is shifted in response to movements of the draft responsive plunger 101 due to changes in the reactive forces on the hitch linkage.

Sensitivity control is not to be confused with draft control wherein the system is adjusted to maintain a selected draft force on the implement. Regulating of the draft is effected by adjustment of the quadrant lever 60 which in effect lengthens or shortens the linkage by which the movements of the plunger 101 are transmitted to the control valve. In making any such draft control adjustment the valve plunger 50 is shifted from its neutral position by this change in the linkage. Accordingly, the control spring 102 must be deflected a greater or less degree than before to effect a movement of the valve plunger which will return it to neutral position.

Present day tractors are used with many kinds of implements besides plows to work soils of widely differing consistencies and over ground levels which may be smooth or so irregular as to produce substantial pitching movements of the tractor. Since the hydraulic system as above described regulates the depth of an implement in respect to soil by raising or lowering the implement relative to the tractor, the tractor wheels are the gauge wheels for the implement and the weight and suction of the implement becomes added weight upon the tractor. Therefore, a light tractor equipped with a system of this character can handle successfully comparatively heavy draft tools. However, its success depends upon the ability of the control system to maintain the transfer of weight to the tractor while accurately gauging the depth of the implement in the soil. These conditions must be maintained over irregular soil levels which cause the tractor to pitch relative to the implement. Since pitching tends to lift or lower the implement in respect to the soil, the system must under such conditions respond to correct the changing depth with such rapidity as to maintain the implement within a permissible variation from a selected depth. The extent of the permissible variation from a selected depth will depend upon (1) the criticalness of depth as a function in determining the quality of the work the implement is doing and (2) the amount of weight in reserve on the tractive tires over that necessary to maintain traction in the particular soil then being worked at such selected depth.

The rate of angular displacement of the lower links during pitching is proportional to the change in the magnitude of the controlling force at the main control spring. The extent to which this controlling force may change is limited primarily by the change in horizontal resistance which the implement encounters within a permissible range of variation from a selected depth. There are two major factors which appear to govern the extent of the change in horizontal resistance; namely, the consistency of the soil (which may vary from a light mulch to a hard clay) and the character of the implement (that is, the horizontal resistance depends upon the total resistance of the soil engaging elements of the implement). Thus, a desirable rate of angular displacement of the lower links will depend upon several factors of which the most important are: (1) The rate of pitching of the tractor; (2) the criticalness of the working depth; (3) the amount of weight in reserve for traction; (4) the consistency of the soil; and (5) the character of the implement.

Reference has been made above to the rate of angular displacement of the lower links which, of course, determines the rate of vertical movement of an implement supported thereby. This rate of angular displacement as a result of a given change in a controlling force is a measure of what has, herein, been termed the "sensitivity"

of the control system. In other words, a system of "high sensitivity" is one in which the rate of angular displacement for such change of controlling force is relatively quite rapid and conversely a system of "low sensitivity" is one in which the rate of angular displacement for such change of controlling force is relatively slow.

Sensitivity or rate of angular displacement may be varied in a system, of the type here under consideration, in several ways. A change in the rate of the main control spring 102 to increase or decrease it from a given value will respectively decrease or increase the sensitivity of the system. Change in sensitivity may also be made by increasing or decreasing the rate of flow of hydraulic fluid to and from the main ram by altering the flow restricting surfaces of the valve assembly. I have conceived, however, that alteration in sensitivity can also be accomplished by altering the ratio of the mechanical connection between the plunger 101 and main valve. For a variety of reasons that is, at present, the most advantageous arrangement for alteration of sensitivity. Accordingly, I have shown and described herein an exemplary mechanism in which sensitivity is altered, indeed controlled or adjusted at will, by variation in the ratio of a leverage or linkage system interposed between the plunger 101 and main valve.

Such a sensitivity control effects a change in the linkage which alters its motion transmitting effectiveness or, in short, the leverage ratio between the motion initiating control element and the valve plunger 50 whereby the extent of movement of the plunger as a result of a change of controlling force is increased or decreased to vary the rate of flow accordingly. More particularly, such sensitivity control determines the extent of movement of the valve plunger and thus the amount of fluid passed by the valve in response to a given movement of the control element without, however, substantially changing the neutral position of the plunger. Adjustments may therefore be made at anytime without disturbing the positioning of the hitch linkage as determined by the setting of the quadrant lever and without any interference from the implement attached to the hitch linkage.

Reference has been made heretofore to the link 100 constituting a part of the valve actuating linkage and the manner in which endwise movements are imparted thereto by the control mechanisms. In the linkage provided by the invention, such movements of the link 100 are transmitted through a main toggle mechanism including a fixed link 140 and a movable link 141 to a valve shifter fork 142. As herein shown the link 140 is pivoted at one end to a normally fixed but adjustable anchorage member consisting, in this instance, of an arm 143 supported on the housing of the pump 46. At its other end the link 140 is pivotally connected to the adjacent end of the movable link 141 and to the lower end of the actuating link 100, preferably by a tubular pivot bushing 144 through which a rivet 145 is inserted to retain the parts in assembled relation. The other end of the movable toggle link 141 is pivotally attached to the shifter fork 142.

As shown in Figs. 3 and 5-9, the shifter fork 142 comprises a pair of elongated arms 148 spaced apart laterally and rigidly secured at their upper ends to a horizontal shaft 149. This shaft projects at opposite sides of the fork and is rotatably received in a pair of brackets 150 extending generally upwardly and rearwardly from the housing of the pump 46. The arms 148 (Fig. 14) are connected at their lower ends by a cross brace 151 having a socket 152 for the reception of a stem 153 swivelly connected with the outer end of the valve plunger 50. A cross shaft 154 extending between the arms 148 in downwardly spaced relation from the shaft 149 projects at one side of the fork to provide for the connection of the movable toggle link 141 to the fork (see Fig. 14).

Figure 3:
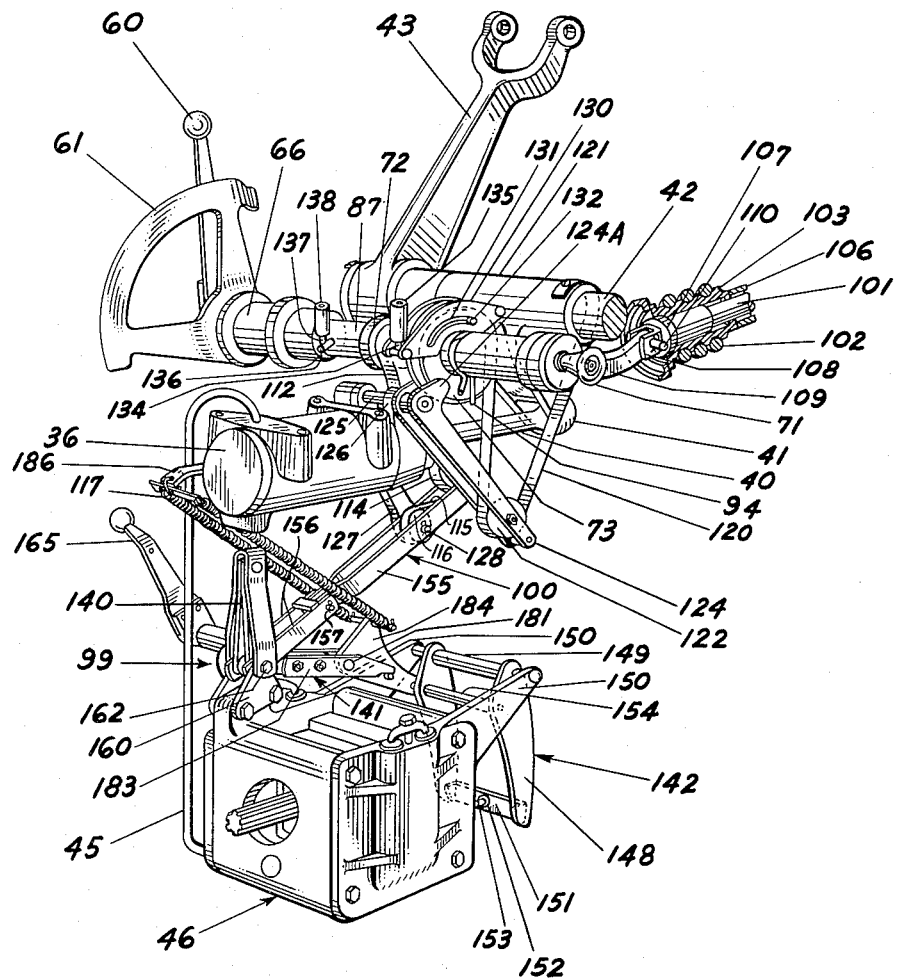
Fig. 3 is a perspective view of the system disassociated from the tractor differential housing within which it is enclosed.

The rocking of the fork 142 to impart inward or outward movements to the valve plunger 50 is effected by the opening or closing of the toggle links in response to endwise movements of the actuating link 100 by the draft or position control mechanisms acting against the force of the spring 117 which is operatively connected with the toggle link 141, as will be described later on. In the particular embodiment illustrated the link 100 is constructed in two sections for convenience of installation or removal when replacement or repair is necessary. The upper or rearmost section is formed from an elongated strip of bar stock bent back upon itself to form two spaced parallel side members 155 (Figs. 3 and 4). The evener sheave 116 of the draft control mechanism is supported between these side members on the crank pin 128 which projects therethrough.

At the lower end, the side members 155 are offset inwardly, thus forming a relatively narrow nose portion which is interposed between two parallel bar sections 156 and secured thereto by a cross pin 157. A short cross bar 158 welded or otherwise secured to the upper edge of the nose portion of the upper link section and overlying the adjacent edge of the bars forming the lower link section limits relative angular movement of the link sections in one direction. More particularly, the arrangement permits the bar sections when alined to function as a rigid bar and yet permits the link to be separated for insertion in or removal of the assemblies from the differential housing. The bar sections 156 are apertured at their lower ends to receive the rivet which retains the bushing 144 constituting the central or common pivot of the toggle links 140 and 141.

In accordance with the invention, I adjust the sensitivity of the linkage by shifting the anchorage point of the fixed toggle link 140 so as to increase or decrease the angular relationship between the two toggle links without changing the position of their common pivotal axis. As the angle between the links is decreased, that is, as they more nearly approach right angular relationship, the motion-transmitting ratio of the linkage is increased. The adjustment of the toggle mechanism for high ratio transmission is illustrated in Fig. 6 and it will be evident from an inspection of this figure that a movement of substantial length will be imparted to the valve plunger 50 in response to a relatively small movement of the link 100.

Conversely, when the link 140 is adjusted for low ratio control, as shown in Fig. 7, the toggle is flattened out so that smaller movements are imparted to the valve plunger for a given movement of the actuating link 100. The range between high and low ratio controls through which sensitivity selection may be made will be determined by other fixed factors in the system, such as the rate of the control spring and the characteristics of the pump and control valve means and in general will be sufficient to enable the operator to condition the system for best performance under the soil conditions being encountered by a particular implement.

To provide for adjusting the anchorage of the fixed link 140, the arm 143 to which it is pivoted is itself mounted for pivotal movement. In the particular embodiment illustrated, the arm 143 is of generally V-shaped configuration and is arranged to straddle a pair of laterally spaced brackets 160 secured to a lug 161 upstanding from the top of the pump housing. Countersunk head bolts 162 extending through the brackets 160 and bushings 160a engage the legs of the arm 143 and allow the latter bracket to swing about a horizontal axis.

As will be seen by reference to Fig. 4, the upper end of the arm 143 is constructed so as to snugly receive the outer end of the fixed toggle link 140 which, in the present instance, is formed by a pair of flat bars spread apart at their lower ends to straddle the toggle link 141. For rocking the arm 143 to effect the foregoing adjustment, I provide manually operable means such as a hand lever 165 (Figs. 4, 11 and 12) at one side of the tractor differential housing within convenient reach of the operator when occupying the seat 62. The hand lever is secured by a crank arm fitting 166 on the outer end of a shaft 167 journaled in a bearing bushing 168 rigid with a cover plate 169 removably secured over an opening 170 in the side wall of the transmission housing 29. The free end of the lever extends through a guide slot formed by an arcuate guide plate 171 secured at opposite ends to a supporting plate 172 as by spacer posts 173. The guide plate 171 is conveniently formed with spaced apertures or indentations 174 for cooperation with a detent pin 175 projecting from the hand lever to releasably retain the lever in selected positions of adjustment.

Rigidly fixed on the inner end of the shaft 167 is a crank arm 176 (Figs. 4, 11 and 14) carrying an eccentric pin 177 engaging in a slot 178 in a lever member 179 rigidly secured to and projecting laterally from one leg of the arm 143. The arrangement is such that the rocking of the hand lever 165 is effective to rock the arm 143 in the opposite direction, thereby adjusting the main toggle for sensitivity.

As the shifting of the main toggle link 140 does not change the common pivotal axis of the two toggle links, it will be apparent that the neutral position of the valve plunger 50 will not be altered by such adjustment. Accordingly, the adjustment may be made at any time without interfering with the operation of the power system. Moreover, comparatively little effort is required to effect the adjustment so that it is possible to shift the adjusting lever 165 by mere fingertip pressure.

Sensitivity adjustment effected when the system is set for position control simply change the ratio of valve plunger travel with respect to the position control elements. Thus, a given movement of the quadrant lever 60 will shift the valve plunger a greater or lesser amount according to the sensitivity setting, but, in any case, this same ratio will obtain between the valve plunger and the position responsive element, in this instance, the rockshaft 42. Accordingly, the valve plunger will be returned to neutral or "off" position when the position of the shaft corresponds to the position of the quadrant lever irrespective of the setting of the sensitivity control.

The sensitivity or rate of response of the hitch links and the implement thereon to changes in draft forces of the power operating system may by the mechanism above described be adapted instantly to the precise requirements of the particular implement associated with the tractor so that the working depth of that implement may be controlled with the degree of precision necessary. Moreover, since adjustment does not itself initiate a repositioning of the hitch linkage and is not influenced by the reactive forces on the linkage, such adjustment may be made while the implement is operating without stopping the tractor or changing the setting of the draft control.

*Automatic break-out*

To prevent damage to the linkage mechanism due to overtravel of the actuating link 100 in a rearward direction, the movable link 141 of the main toggle mechanism is constructed to provide a sort of knee action motion or "break-out" action. Such overtravel may occur upon application of an emergency overload, upon too rapid downwardly movement of the quadrant lever 60, upon application of an excess movement toward tension when the system is set for automatic draft control, upon rotation of the rockshaft 42 in a raising direction (counterclockwise) by an external force, etc. In such movement of the actuating link the main toggle is flattened and the shifter fork is rocked against a fixed stop 180 (Figs. 5–9). This stop is arranged to interrupt the movement of the fork before the valve plunger is withdrawn from the pump housing. Continued movement of the actuating link following the engagement of the fork with the stop results in the "breaking" of the toggle link 141, as shown in Fig. 8. As the power system reacts to the shifting of the valve plunger and the positioning movement of the hitch linkage catches up with the actuating link, the toggle link 141 is automatically restored to its normal condition and operation proceeds in the normal manner.

To afford the "break-out" above referred to, the movable toggle link 141 is constructed in the form of an auxiliary toggle mechanism. More particularly the link is constructed in two link sections connected for pivotal movement by a cross pin 181. In the preferred form illustrated, one link section comprises a flat bar 182 apertured at one end to receive the main toggle pivot bushing 144 as shown in Fig. 14. To the other end of the bar 182 are bolted a pair of elongated bar elements 183. Preferably the bar 182 is slotted for the reception of bolts so that the over-all length of the link section may be properly adjusted during assembly as required to locate the valve plunger 50 at its neutral position with the pivotal axes of arm 143, link 140, actuating link 100 and toggle link 141 coincident, as shown in Fig. 5. The cross pin 181 extends through the bar elements 183 which are arranged to straddle the companion link section 184.

As shown in Figs. 5–9, the link section 184 is in the form of a triangular plate apertured at one corner for the reception of the cross pin 181 and at another corner for the reception of the shaft 154 of the valve fork 142. The main toggle biasing springs 117 are anchored to the third corner of the link at pin 185. In the exemplary embodiment two of these springs 117 are provided arranged to straddle the toggle actuating link 100 and having their hook-shaped ends engaged with a pin 185 projecting at opposite sides of the toggle section 184. The other ends of the springs may be anchored to a stationary bracket 186 (Fig. 3) attached to a suitable part of the structure such as the ram cylinder 36. This spring arrangement permits the use of relatively short springs and provides balanced tension on the toggle mechanism.

It will be apparent that the tension of the springs 117 tends to flatten out the auxiliary toggle mechanism, or in other words, to swing the link sections into a straight line. To prevent overtravel of these link sections under the influence of the springs, the bar elements 183 are extended beyond the cross pin 181 and their end portions are notched as at 187 and adapted to bear against a pin 188 rigid with the link section 184. Under normal operating conditions the link sections are retained in the position shown in Figs. 3, 5 and 7, and are thus effective to operate as a rigid bar. Upon the occurrence of an overload condition as above described, the link sections move to the position shown in Fig. 8, thus permitting overtravel of the actuating link 100 and main toggle mechanism without damage thereto. The action of the springs 117 of course yieldably retains the shifter fork 142 in its outer limit position with the valve plunger 50 positioned to vent the ram cylinder 36. When the ram cylinder responds, the actuating link 100 is permitted to advance under the influence of the springs 117 until the auxiliary toggle is straightened out. Thereafter such response is transmitted to the valve shifter fork 142 in the normal manner.

*Emergency overload release*

Provision is made for unloading the power operating system of the tractor automatically when the draft load exceeds a predetermined safe value, as, for example, when a plow pulled by the tractor strikes an obstruction such as an underground boulder or stump. Under such conditions it is desirable that the pressure fluid be released from the ram so that the traction load on the tractor's rear wheels will be relieved and they can spin freely, thus avoiding damage to the tractor, implement or connecting linkage.

Merely for the sake of completeness of disclosure, I have shown herein an emergency release mechanism of the type disclosed in my copending application Serial No. 99,546, filed June 16, 1949, now Patent No. 2,677,322. This mechanism is operative to effect overload release automatically upon occurrence of a draft load in excess of a predetermined value and irrespective of whether the system happens to be conditioned for automatic draft control or for position control. It is therefore particularly well suited for use with the power operating system of the present invention, although it is not limited to use with that system. To avoid unnecessarily complicating the drawings, this emergency release mechanism has been shown in Figs. 15–18 and omitted from other figures of the drawings in which the mechanism or parts of it would normally appear.

In general, automatic overload release during either draft control or position control is brought about by forward movement of the plunger 101 beyond its normal draft control limit position and the consequent swinging of the rocker arm 112 to a release position. In the exemplary system, such movement of the rocker arm is utilized to initially open or "crack" a release valve 190 associated with and effective to vent the ram cylinder 36. The construction and arrangement is such that even a small initial opening of the valve is effective to bring about its immediate full opening and the substantially instantaneous and complete venting of the ram cylinder. The release valve 190 is further characterized by its ability to remain in open position until some positive action is taken by the tractor operator to interrupt the delivery of pressure fluid to the ram cylinder. This may be done by backing the plow away from the obstruction with the quadrant lever in lowered position and thereby allowing the control valve 50 to close, or alternatively, the pump 46 may be stopped by disengaging its driving clutch and the quadrant lever full lowered.

After impact the operator disengages the clutch, stopping the tendency of the tractor to produce the draft force which may maintain the valve in intake position. Disengaging the clutch also stops delivery of oil. For almost any condition lowering the quadrant lever will open the drop ports if they are not already open, thus allowing the valve to close.

Referring more particularly to Figs. 17 and 18 of the drawings, the valve 190 as herein shown comprises an elongated casing formed in this instance by two tubular members 191 and 192 of different internal diameters assembled with one end of the smaller member telescopically engaged in the adjacent end of the other member. The outer end of the larger casing member 191 is received in a hollow bracket 193 bolted or otherwise secured to the underside of the ram cylinder 36 adjacent its forward end, whereby the valve is supported below and in substantially parallel relation to the ram cylinder. The larger end of the valve chamber communicates directly with the ram cylinder 36 by way of connecting passages 195 (Figs. 15 and 16) in the member 191 and bracket 193 and a port 196 opening from the forward end of the ram cylinder. The smaller end of the valve chamber opens into an auxiliary chamber 197 (Fig. 17) formed in a bell-shaped fitting 198 suitably secured to the member 192. The auxiliary chamber 197 is of substantially greater cross-sectional area than the larger section of the valve chamber 194 and has a laterally opening port 199 (Figs. 15 and 18) formed by cutting away a part of the side wall of the fitting 198.

Extending through the valve chamber 194 is an elongated stem 200 fitted at one end with a piston 201 working in the larger end of the valve chamber and at the other end with a valve member or head 202 having its inner end beveled to provide a generally conical surface 203 adapted to seat against the adjacent end of the tubular member 192 to close the valve chamber. The other or outer end of the valve member 202 is formed with an enlarged circumferential flange 204 having a working fit in the auxiliary chamber 197 and operative to regulate the effective area of the vent port 199. The position of the flange is such that the vent port is closed as the valve member approaches seating engagement with the valve casing and the port is opened progressively as the valve member moves rearwardly from the casing. It will be understood of course that suitable packing is provided for both the plunger 201 and valve member 202 to prevent leakage of high pressure fluid when the valve is closed.

A light coil spring 205 interposed between the end of the tubular member 192 and the adjacent end of the piston 201 urges the latter outwardly from the valve chamber. Such movement is transmitted to the valve stem 200 through a stop washer 206 and lock nuts 207 threaded on the end of the stem. A stop washer 206a and stops nuts 207a threaded on the other end of the stem restrict movement of the valve member 202 relative to the stem.

Since the ram cylinder 36 and valve chamber 194 are in direct communication, the inner face of the piston and the exposed inner face of the valve member 202 will be subjected to the full pressure of the fluid in the hydraulic system. The piston 201 of course has a substantially greater effective area than the valve member 202 and consequently the valve assembly will be urged in a direction (to the left as viewed in Fig. 17) to effectually seal the valve chamber.

Upon movement of the valve assembly in the other direction, unseating of the valve member 202 from the casing member 192 will permit a flow of pressure fluid from the valve chamber 194 into the auxiliary chamber 197. The pressure exerted by this fluid against the relatively large effective area of the flange 204 is operative to overcome the force exerted on the piston 201 and the valve assembly is therefore shifted quickly toward the full open position. In this movement the vent port 199 is opened and the pressure in the system is relieved substantially instantaneously.

As pressure in the system drops, the release valve will tend to close, but so long as any flow obtains, the force exerted on the valve member 202 will prevent complete closure of the valve. Accordingly, the supply of pressure fluid to the ram must be interrupted before the valve can be closed.

When incorporated in the instant power operating and control system, initial opening or "cracking" of the valve 190 is effected through the medium of a push rod 210 (Figs. 15 and 18) supported for endwise sliding movement by a bracket 211 at one side of the cylinder with one end positioned for coaction with the sheave 114 carried by the rocker arm 112. As explained heretofore, the arm is rocked forwardly upon movement of the draft responsive plunger 101. When an overload occurs the arm is swung beyond its normal control position, advancing the sheave 114 to the position shown in broken lines in Fig. 15 in which it engages a contact element 212 on the end of the push rod 210 to shift the rod forwardly. To provide for adjusting this point of engagement, the contact element 212 is in the form of a screw threaded into the end of the push rod and locked in place by a nut 213.

At its other end the push rod 210 is pivotally connected by a pin 214 to one arm of a rocker member 215 pivotally supported by a pin 216 on an extension of the bracket 193. The other arm of the rocker bears against the projecting end of the valve stem 200, as shown in Figs. 16–18. It will be apparent therefore that forward movement of the push rod 210 will be effective to shift the valve stem 200 in the opposite direction and unseat the valve member 202. Such unseating of the valve member initiates the full opening of the release valve 190 as above explained.

When the hydraulic system is arranged to use the oil in the tractor differential housing as the fluid medium, the discharge from the overload release valve 190 may be utilized advantageously to lubricate various elements of the power operating system and associated controls. For this purpose the valve is mounted so that its discharge end projects rearwardly of the ram cylinder 36 and with the vent port 199 facing generally upwardly, as shown in Figs. 15 and 18. Under conditions which bring about the opening of the release valve the oil in the system is under relatively high pressure. As the valve opens the oil in passing out of the valve chamber impinges on the valve member 202 and its flange 204 and is broken up into a fine spray as it is discharged from the vent port 199. The oil is thus effectively distributed over the various elements enclosed in the differential housing.

Résumé of operation

As the type of control to be used is determined primarily by the particular implement connected to the hitch linkage, selection between automatic draft control and position control is usually made preliminary to starting operation, that is, the selector mechanism is adjusted or set at the time the implement is connected and while the tractor is stopped. Such selection is effected by grasping the knob 71 and shifting the selector shaft 70 axially inwardly for automatic draft control or outwardly for position control. This can be done by the tractor operator without dismounting since the knob is located in a conveniently accessible position just below the operator's seat at the side opposite the quadrant lever 60. Relatively little force is required to shift the selector shaft as it is only necessary to overcome the restraining action of the detent spring 94.

When the hitch linkage is in transport position the keys 88 and 83 are accurately alined with their respective keyways in the draft control sheave 72 and position control sheave 73 by the action of the stops 136 and 134. Accordingly, the shift may be made without any manual manipulation of the shaft other than pushing it or pulling it in the desired direction. In other positions of the hitch linkage, as when the implement is resting on the ground with the pump idle, a slight relative rotation of the selector shaft and one or the other of the control sheaves may be necessary to aline the keys and keyways. Such rotation may be effected by appropriate manipulation of the quadrant lever 60.

Upon association of the sheave 72 with the selector shaft 70 automatic draft control becomes effective and the operation of the valve mechanism is placed under joint control of the quadrant lever 60 and the draft-responsive plunger 101. As explained heretofore, the plunger is movable in accordance with variations in a force corresponding in magnitude and sense to the sum of the moments acting on the implement attached to the hitch linkage tending to rock the implement fore and aft about the linkage, the force being applied through the upper hitch link 21. This force on the plunger is resisted by the main spring 102 and consequently the plunger is variably positioned in accordance with the forces acting on the implement.

The position of the quadrant lever 60 and the sheave 72 controlled by the lever determines the effective length of the flexible band 115 and thus the position the plunger 101 must occupy to locate the valve plunger 50 in the neutral position. Thus when the quadrant lever is in the upper ranges of its adjustment the band is unwound from the sheave 72 to increase its effective length and a relatively low resistance to forward movement of the implement will exert sufficient force on the top link 21 to maintain the plunger 101 in position to operate the valve mechanism to neutral position. Upon any increase or decrease in such resistance, the reaction of the plunger 101 thereto will shift the valve plunger in an appropriate direction to effect a raising or lowering of the implement until the system is again in balance, that is, until the resistance imposed on the implement corresponds to the setting of the quadrant lever.

With the quadrant lever 60 in its uppermost position as shown in Fig. 5, control of the system is assumed by the transport shut-off mechanism previously described. Under such conditions, the position control sheave 73 is held against rotation and the band 120 is wound up on the sleeve 121 until the valve plunger 50 is returned to the neutral or "Off" position. The flexible band 115 is therefore free of tension and to effect lowering of the implement, the quadrant lever must be lowered sufficiently to take up the slack in the band before the valve plunger 50 can be shifted to the lowering position. If the main control spring 102 is not in tension, a slightly greater lowering movement of the quadrant lever is required to initiate the lowering of the implement as the control spring provides the force for overcoming the action of the spring 117.

When the quadrant lever is shifted progressively downwardly or in an implement lowering direction, a gradually increasing forward displacement of the plunger 101 is required to maintain the system in balance. For example, with the quadrant lever in the lower range of its adjustment, an increased resistance to implement movement is required to shift the valve plunger to neutral position and accordingly the implement will tend to run the greater depth at which such resistance is afforded. As in the case of the previously described setting, any departure from that depth will be reflected by corresponding changes in the position of the draft-responsive plunger 101 and will be corrected immediately by the automatic action of the power-operating system.

Downward movement of the quadrant lever 60 is opposed only by the force exerted on the main transmitting linkage 99 by the biasing spring 117 and consequently such movements may be effected with finger-tip pressure on the lever. Movements of the lever in the opposite direction simply act to release the wedge lock 92 and the spring 117 resets the valve plunger in accordance with the position to which the lever is shifted.

Position control is effected with equal ease, movements of the quadrant lever 60 serving to rotate the selector shaft to wind the band 120 on the sheave 73 or to unwind it therefrom. The lengthening or shortening of the band operates through the linkage 99 and valve plunger 50 to initiate operation of the power mechanism to impart a raising or lowering movement to the rockshaft 42. The other end of the band 120 is thereby unwound from the sleeve 121 on the shaft or wound thereon until the valve plunger is returned to neutral position. The parts are proportioned so that this occurs when the rockshaft has positioned the hitch links precisely at the level designated by the position of the quadrant lever.

In case the valve actuating link 100 is shifted forwardly too rapidly for the follow-up action of the power mechanism to keep pace, the lever 142 will be swung against the fixed stop 180 and thereafter the knee joint provided by the auxiliary toggle in the link 141 will "break," as shown in Fig. 8. The link 100 may thus execute its full stroke without damage to the valve mechanism or associated elements of the controls.

To adjust the sensitivity of the controls for proper response to the forces acting on the implement attached to the hitch linkage, it is only necessary for the operator to grasp the hand lever 165 and move it up or down according to whether a decrease or increase in sensitivity is desired. The latch pin 175 which serves to retain the lever in set position may be disengaged by springing the lever inwardly from the quadrant 171 and movements of the lever may then be effected with finger-tip pressure. As the lever is moved downwardly toward its upper or high-ratio position in which it is shown in Fig. 6, the angle of the main toggle links 140 and 141 is increased so that a movement of maximum length is imparted to the valve plunger 50 for a given movement of the actuating link 100. Thus when set for maximum sensitivity, a relatively short movement of the link 100 as indicated at A in Fig. 6 will impart a substantially longer movement to the valve plunger as indicated at B. Such longer movements, of course, serve to open one or the other of the ports 51 or 52 wider to accommodate a greater flow of fluid to or from the ram cylinder 36 and thus effect a more rapid raising or lowering of the hitch links and the implement connected thereto. Accordingly, automatic draft adjusting actions of the power system will not only be initiated in response to comparatively small displacements of the draft responsive plunger 101 but the responsive raising or lowering of the implement for a given displacement of the plunger will be effected at a much more rapid rate than when the system is set for low sensitivity.

Movement of the sensitivity adjusting lever 165 upwardly or toward the low-ratio position shown in Fig. 7 flattens out the main toggle links and thereby reduces the motion-transmitting effectiveness of the valve actuating linkage. As the lever is shifted upwardly, the ratio of the valve movement to displacement of the draft-responsive plunger decreases progressively. With the main toggle set as shown in Fig. 7, for example, a movement of the link 100 through the same distance A as in the previous instance is effective to shift the valve plunger only through the smaller distance indicated at B'. The opening of the valve ports 51 or 52 is therefore such that a smaller volume of fluid is passed therethrough and the resultant raising or lowering of the implement is effected at a slower rate. With this adjustment the desired working depth of a heavy draft implement may be maintained within very close limits without excessive "hunting" by the valve plunger or too frequent operation of the power machine.

Sensitivity adjustments may be made at any time, even when the implement attached to the hitch linkage is working. Since such adjustment is made about the center which establishes the neutral position, it does not substantially affect the draft setting established by the quadrant lever. The operator may thus establish the best control ratio for the particular implement attached to the hitch linkage by observing the implement in actual operation.

It is to be noted that a lack of judgment on the part of the operator in setting the selectivity control at an exact value for any given condition is unimportant since the system will function to control depth regardless of the setting of the sensitivity control mechanism. As a matter of fact the operator is entirely free to exercise his best judgment in selecting the sensitivity value which will, in his opinion, produce best the desired performance of the tractor and implement. Thus, assuming a given soil condition both as to type of soil and irregularity of soil surface to be worked by a given implement on the tractor, the operator will shift the sensitivity control lever during the operation of the implement in the soil until he has reached an adjustment wherein the rate of response of the implement under the control of the system will maintain the implement at a selected depth with a degree of accuracy desired while maintaining the required transfer of weight to the tractor for proper traction. The higher the sensitivity of the system the more rapid is the response thereof to changes in the controlling force which of course means that the system will function more frequently under a high sensitivity setting than under a low one and that small changes in the controlling force will be more effective in actuating the system under high than under low sensitivity conditions. Consequently, the operator will usually set the sensitivity control as low as possible while still achieving the desired performance of the tractor and implement. Such a setting will conserve power, save unnecessary operation of the system and minimize its operation as a result of such small momentary changes in the controlling force as are produced when the implement encounters small stones, roots or the like which do not particularly affect the operation of the implement and certainly do not require a compensating adjustment of depth.

Regardless of whether the system is set for draft control or for position control, the overload release mechanism goes into action automatically whenever the implement encounters an obstruction that places a predetermined overload on the hitch linkage. Forward displacement of the draft-responsive plunger 101 under the influence of the overload and the concurrent swinging of the rocker member 112 forwardly actuates the push rod 210 to "crack" the release valve 190. The valve immediately opens fully to initiate a "lowering" action of the power system by venting the ram cylinder. The weight on the driving wheels of the tractor is thus relieved so that the wheels may slip and thereby prevent damage to the tractor, the implement or the hitch linkage connecting them. As the release valve remains open as long as pressure fluid is supplied to the ram, the tractor is protected until the operator stops the pump or takes other appropriate action to interrupt the supply of pressure fluid to the ram. Following such action the valve closes and the system is again conditioned for operation.

I claim as my invention:

1. In a tractor having a vertically movable hitch linkage, in combination, a hydraulic power unit driven from the tractor engine and connected to said linkage for raising and lowering the same, said power unit having a valve mechanism shiftable from a neutral or "off" position in respective opposite directions alternatively into raising or lowering positions, an axially slidable plunger mounted on the tractor, means for moving said plunger in accordance with a force corresponding in magnitude and sense to the sum of the moments acting on an implement pivotally trailed from said hitch linkage and tending to rock said implement fore and aft about the linkage, spring means anchored to the tractor and to said plunger for yieldably resisting displacement of the latter in either direction under the urging of said force, a linkage system interposed between said plunger and said valve mechanism for transmitting movements of the plunger to the valve mechanism, said linkage including a plurality of interconnected links at least one of which is adjustable to vary the motion-transmitting ratio of the linkage system, and means including a hand lever for adjusting said one link.

2. In a tractor having a vertically movable hitch linkage, in combination, a hydraulic power unit driven from the tractor engine and connected to said linkage for raising and lowering the same, said power unit having a valve mechanism shiftable from a neutral or "off" position in respective opposite directions alternatively into raising or lowering positions, an axially slidable plunger mounted on the tractor, means for moving said plunger in accordance with a force corresponding in magnitude and sense to the sum of the moments acting on an implement pivotally trailed from said hitch linkage and tending to rock said implement fore and aft about the linkage, spring means anchored to the tractor and to said plunger for yieldably resisting displacement of the latter in either direction under the urging of said force, a linkage system interposed between said plunger and said valve mechanism for transmitting the movements of the plunger to the valve mechanism, means for effecting a change in said linkage system to alter its motion-transmitting effectiveness and thereby determine the ratio of the movements of the valve mechanism with respect to the movements of said plunger, and manually operable means for adjusting said change-effecting means.

3. In a tractor having a vertically movable hitch linkage, in combination, a hydraulic power unit driven from the tractor engine and connected to said linkage for raising and lowering the same, said power unit having a valve mechanism shiftable from a neutral or "off" position in respective opposite directions alternatively into raising or lowering positions, an axially slidable plunger mounted on the tractor, means for moving said plunger in accordance with a force corresponding in magnitude and sense to the sum of the moments acting on an implement pivotally trailed from said hitch linkage and tending to rock said implement fore and aft about the linkage, spring means anchored to the tractor and to said plunger for yieldably resisting displacement of the latter in either direction under the urging of said force, a linkage interposed between said plunger and said valve mechanism for transmitting the movements of the plunger to the valve mechanism, manually operable means for adjusting said linkage to alter the point in plunger travel at which said valve mechanism is located in said "off" position, said linkage including a part adjustable to alter its motion-transmitting effectiveness and thereby vary the ratio of the movements of said valve mechanism with respect to the movements of said plunger without changing the "off" position of the valve mechanism, and manually operable means for adjusting said part.

4. In a power operating system for a tractor-borne draft linkage, the combination of a hydraulic actuator operative to raise or lower the linkage, shiftable valve mechanism controlling the supply of pressure fluid to and exhaust of fluid from said actuator, a control member adapted to be displaced progressively in proportion to the draft load imposed on said linkage, means for shifting said valve mechanism in response to the displacement of said control member including a lever operatively associated with the valve mechanism, a pair of pivotally interconnected toggle links, one of said links extending to and being pivotally secured to said lever, a stationary arm pivotally supporting the other of said links, actuating means connecting said control member with the pivot of said toggle links, and means for shifting said arm to adjust the angular relationship of said toggle links.

5. In an operating system for a tractor hitch linkage, in combination, power-operating means for raising and lowering the hitch linkage, a spring biased draft-responsive member adapted to be displaced proportionately to the draft load imposed on an implement connected to the hitch linkage, control mechanism shiftable to determine the direction of operation of said power-operating means, means including a mechanical motion transmitting linkage for shifting said control mechanism concurrently with and in response to the displacement of said draft-responsive member, mechanism comprising a part of said motion-transmitting linkage adjustable to vary the motion transmitting effectiveness of the linkage, and means for adjusting said mechanism to determine the extent said control mechanism is to be shifted for any given displacement of said draft-responsive member.

6. In an operating system for a tractor hitch linkage, in combination, power-operating means for raising and lowering the hitch linkage including a pressure fluid operated actuator, a spring biased draft-responsive member supported on the tractor and adapted to be displaced proportionately to the draft load imposed on an implement connected to the hitch linkage, valve mechanism shiftable to determine the direction of pressure fluid flow with respect to said actuator, means including a mechanical motion transmitting linkage for shifting said valve mechanism concurrently with and in response to the displacement of said draft-responsive member, mechanism comprising a part of said motion-transmitting linkage adjustable to vary its motion-transmitting effectiveness and thereby to determine the extent said valve mechanism is to be shifted for any given displacement of said draft-responsive member, and manually operable means for adjusting said mechanism.

7. In an operating system for a tractor hitch linkage, in combination, power operating means for raising and lowering the linkage, a spring biased draft-responsive member shiftable in opposite directions from a neutral position in response to the forces imposed on the linkage by an implement connected thereto, control mechanism for said power-operated means, motion transmitting mechanism operative to shift said control mechanism concurrently with and in response to the shifting of said draft-responsive member, adjustable mechanism included in said motion-transmitting mechanism operable to determine the extent of movement of said control mechanism for any predetermined movement of said draft-responsive member, and a hand lever for adjusting said adjustable mechanism.

8. The combination with a tractor having an implement hitch trailingly mounted thereon and a power unit for raising and lowering the hitch, a pivoted hand lever, alternatively available controls for actuating said power unit to effect, in the one case, automatic retention of a uniform draft load on said hitch at a value determined by the setting of said hand lever, and in the other case, raising or lowering of said hitch in positional agreement with the setting of said hand lever, and a selector shaft shiftable axially to render a selected one of said controls operative and to disable the other control.

9. The combination with a tractor having an implement hitch trailingly mounted thereon and a power unit for raising and lowering the hitch, a pivoted hand lever, alternatively available controls for actuating said power unit to effect, in the one case, automatic retention of a uniform draft load on said hitch at a value determined by the setting of said hand lever, and in the other case, raising or lowering of said hitch in positional agreement with the setting of said hand lever, a shaft adapted to be rocked by said hand lever and shiftable axially relative thereto, and an element of each of said controls mounted on said shaft, said elements being operatively coupled with the shaft individually and selectively by axially shifting the shaft between two set positions.

10. The combination with a tractor having an implement hitch trailingly mounted thereon and a power unit for raising and lowering the hitch, a pivoted hand lever, alternatively available controls for actuating said power unit to effect, in the one case, automatic retention of a uniform draft load on said hitch at a value determined by the setting of said hand lever, and in the other case, raising or lowering of said hitch in positional agreement with the setting of said hand lever, a shaft supported for rotation by said hand lever and for axial movement relative thereto between two alternate positions, a pair of sheaves supported on said shaft respectively constituting elements of said two controls, and keys spaced axially of said shaft operatively engageable with said sheaves alternately to effect a driving connection therewith in alternate positions of the shaft.

11. In a tractor having an implement hitch trailingly mounted thereon and a power unit for raising and lowering the hitch, a pivoted hand lever, a shaft rotatable by said lever, alternatively available controls for actuating said unit to effect, in the one case, automatic retention of a uniform draft load on said hitch at a value determined by the setting of said hand lever, and in the other case, raising or lowering said hitch in positional agreement with the setting of said hand lever, each of said controls including an element rotatably mounted on said shaft, means for shifting said shaft axially between two alternate positions, and cooperating keys and keyways for nonrotatably locking the respective elements to the shaft selectively in said alternate positions.

12. In a power-operating system for an implement hitch movably mounted on a tractor, the combination of a hydraulic actuator, valve mechanism for controlling the supply and exhaust of pressure fluid to and from said actuator, a draft-responsive member movable in proportion to changes in the reactive force of an implement attached to said hitch, a linkage including a shiftable actuating link for positioning said valve mechanism, spring means yieldably urging said actuating link in one direction, a flexible tension member operatively connecting said draft-responsive member with said actuating link, and manually operable means for varying the effective length of said flexible member to modify the positioning of said valve mechanism in response to movements of said draft control member.

13. In an operating system for a tractor hitch linkage, in combination, a power-operated actuator for raising and lowering the hitch linkage, a draft-responsive member displaceable in proportion to changes in the reactive force of an implement attached to the hitch linkage, a member shiftable to determine the direction of operation of said actuator, spring means yieldably urging said member in one direction, a rotatable element, a flexible member anchored at one end to said rotatable element and at the other end to said shiftable member, a sheave supported for bodily movement transversely of said flexible element and engageable with the intermediate portion thereof to resist the movement of said shiftable member by said spring means, said sheave being movable with said draft-responsive member so as to regulate the position of said shiftable member in accordance with the reactive force of the implement attached to the hitch linkage, and manually operable means for rotating said rotatable element to vary the effective length of said flexible element and thereby modify the positioning action of said draft-responsive member.

14. In an operating system for a tractor hitch linkage, in combination, a power operated actuator for raising and lowering the hitch linkage, a draft-responsive member displaceable in proportion to changes in the reactive force of an implement attached to the hitch linkage, a member shiftable to determine the direction of operation of said actuator, spring means yieldably urging said member in one direction, a flexible element stationarily anchored at one end and anchored at the other end to said shiftable member, a sheave supported for bodily movement transversely of said flexible element and engageable with the intermediate portion thereof to resist the movement of said shiftable member by said spring means, and means connecting said sheave for movement with said draft responsive member whereby to regulate the position of said shiftable member in accordance with the reactive force of the implement attached to the hitch linkage.

15. In a power-operating system for a tractor-borne draft linkage, the combination of a hydraulic actuator operative to raise or lower the linkage, shiftable valve mechanism controlling the supply of pressure fluid to and exhaust of fluid from said actuator, a control member adapted to be displaced progressively in proportion to the draft load imposed on said linkage, means for shifting said valve mechanism in response to the displacement of said control member including a lever operatively associated with the valve mechanism, a pair of pivotally interconnected toggle links having their opposite ends connected respectively to said lever and to a stationary element, and actuating means connecting said control member with the pivot of said toggle links.

16. In an operating system for a tractor hitch linkage, in combination, a shaft adapted to be rocked in opposite directions to raise or lower the linkage, power-operated means for rocking said shaft, a manually rotatable sheave, a sheave rotatable with said shaft, a flexible element anchored at opposite ends to said sheaves, a control element engaged by said flexible element intermediate said sheaves, said control element being operable when said manually rotatable sheave is rotated in a direction to wind up said flexible element for initiating the operation of said power-operated means in a direction to rock said shaft and unwind the flexible element from the sheave rotatably therewith so as to maintain a bight of uniform length between the sheaves in all angular positions of the manually rotatable sheave.

17. In an operating system for a tractor hitch linkage, in combination, a rockshaft operatively connected with the linkage, power-actuated means for rocking said shaft to raise or lower the linkage, a control shaft, sheaves mounted on and rotatable with said shafts, a flexible band anchored at opposite ends to the respective sheaves, manually operable means for rotating said control shaft to wind said band on or unwind it from the sheave on that shaft, and control means actuated by said band for causing said power-actuated means to turn said rockshaft in a direction and through an angle effective to wind the band on or unwind it from the sheave thereon so as to maintain a predetermined length of band between the two sheaves in all angular positions of the control shaft.

18. The combination with a tractor having an implement hitch trailingly mounted thereon and a power unit for raising and lowering the hitch between working and transport positions, a pivoted hand lever, alternatively available controls for actuating said power unit to effect, in the one case, automatic retention of a uniform draft load on said hitch at a value determined by the setting of said hand lever, and in the other case, raising or lowering said hitch in positional agreement with the setting of said hand lever, a selector shiftable to alternatively render either one of said controls operative and the other inoperative, and stop means operative automatically to condition said other control for interrupting the operation of said power unit irrespective of the setting of said selector means upon movement of the hitch link to the transport position.

19. The combination with a movable element and a stationary element, a toggle mechanism including a first link pivotally secured at one end to the stationary element, a second link pivotally secured at one end to the other end of said first link, a third link pivotally secured at one end to the movable element and at the other end to the corresponding end of said second link, stop means on said third link engageable by said second link to limit relative movement of the links toward an alined position, spring means acting on said third link yieldably urging the second and third links toward an alined position and urging said first and second links away from the alined position, and an actuating member for said toggle mechanism connected at the common pivot of said first and second links for resisting the action of said spring means.

20. The combination with a shiftable valve mechanism, of a lever having its free end operatively associated with the valve mechanism and swingable to shift the same, a fixed stop for limiting the swinging of the lever in one direction, means for swinging said lever including a pair of links pivotally connected together at one end and having their opposite ends connected respectively to said lever and to a fixed support and an actuating member connecting to the junction point of said links for rocking them to vary the distance between the fixed support and the point of connection between the link and said lever, the link connected with said lever having a knee joint adapted to "break" upon movement of said links beyond the point necessary to rock said lever against said stop.

21. In a tractor having an implement hitch trailingly mounted thereon and a power unit for raising and lowering the hitch, a hand lever, a shaft rotatable by said lever, alternatively available controls for actuating said unit to effect, in the one case, automatic retention of a uniform draft load on said hitch at a value determined by the setting of said hand lever, and in the other case, raising or lowering said hitch in positional agreement with the setting of said hand lever, each of said controls including an element rotatably mounted on said shaft, a linkage interposed between said elements and the power unit, means for operatively associating said elements with said shaft individually and selectively for rotation with the shaft, said linkage including a series of interconnected links, and manually operable means for adjusting at least one of the links to vary the rate of response of said power unit to changes in the draft load imposed on said hitch links.

22. In a tractor having hitch links for connection with an implement, in combination, power actuated means on the tractor for raising and lowering the hitch links to determine the working depth of the implement, a control plunger supported on the tractor for endwise movement and spring biased to a predetermined position, said plunger being connected with the implement by one of the hitch links and displaceable from that position an amount directly proportioned to changes in the draft load imposed on the other hitch links by the implement, control mechanism for said power actuated means operable concurrently with and in response to changes in the position of said control device, and interconnected links forming a part of said control mechanism relatively adjustable to vary the rate of response of said power actuated means to any given displacement of the plunger.

23. In a tractor having vertically movable hitch links to which an implement may be connected in trailing relation to the tractor, in combination, a hydraulic power unit driven from the tractor engine and connected to said links for raising and lowering the links and the implement connected thereto, said power unit having valve mechanism shiftable from a neutral position in respective opposite directions alternatively to effect the raising or lowering of said hitch links, a spring biased control member mounted on the tractor adapted to vary in position in accordance with the draft load imposed on said hitch links by the implement, a motion-transmitting linkage connecting said control member with said valve means operative to shift the same in response to changes in the position of said control member whereby to raise or lower the hitch links and the implement to maintain a substantially uniform draft load on the hitch links, and mechanism included in said motion-transmitting linkage adjustable to vary the rate of response of said power unit to changes in the position of said control member.

24. In a tractor having vertically movable hitch links to which an implement may be connected in trailing relation to the tractor, in combination, a hydraulic power unit driven from the tractor engine and connected to said links for raising and lowering the links and the implement connected thereto, said power unit having valve mechanism shiftable from a neutral position in respective opposite directions alternatively to effect the raising or lowering of said hitch links, said valve means being effective to control the rate of movement of the hitch links in accordance with the extent of its shifting from the neutral position, a spring biased control member variably positioned in accordance with the draft load imposed on said hitch links, a motion-transmitting linkage connecting said member with said valve means operative to shift the same in response to changes in the position of the control member whereby to raise or lower the hitch links and the implement to maintain a substantially uniform draft load on the hitch links, and mechanism included in said motion-transmitting linkage adjustable to vary the extent said valve means is shifted in response to a given change in the position of said control member.

25. The combination with a tractor having an implement hitch trailingly mounted thereon and a power unit for raising and lowering the hitch, a hand lever, a control means for actuating said power unit to effect a raising or lowering of said hitch in positional agreement with the setting of said hand lever, and a linkage included in said control means adjustable to selectively determine the rate of response of said power unit to a given change in the position of said hand lever.

26. The combination with a tractor having an implement hitch linkage trailingly mounted on its center housing and a power unit enclosed within the housing operable to raise and lower the linkage, of means within the housing shiftable to control the operation of said power unit, means supported on and externally of the housing and having a connection with an implement attached to the hitch linkage so as to respond to changes in the draft load on the implement by movements directly proportioned to the draft load changes, means within the housing interposed between said draft responsive means and said control means operative to shift said control means selectively varying distances for any given movement of the draft responsive means, and means operable manually to condition said last mentioned means for shifting said control means a selected distance for a given movement of the draft responsive means.

27. The combination with a tractor having an implement hitch linkage trailingly mounted on its center housing and a hydraulic power unit enclosed within the housing operable to raise and lower the linkage, of valve means connected to the unit and shiftable to control its operation, means supported on and externally of the housing and having a connection with an implement attached to the hitch linkage so as to respond to changes in the draft load on the implement by movements directly proportioned to the draft load changes, means within the housing interposed between said draft responsive means and said valve means operative to impart to the valve means movements bearing any one of a selected number of ratios to the movement of the draft responsive means, and means forming a part of said last mentioned means settable manually to select the ratio of such movement.

28. In a tractor having vertically movable hitch links to which an implement may be connected in trailing relation to the tractor, in combination, a hydraulic power unit including a pump driven from the tractor engine and a hydraulic actuator connected to said links for raising and lowering the links and the implement connected thereto, valve mechanism connected to said power unit including a plunger shiftable from a neutral position in one direction to initiate delivery of pressure fluid from said pump to said actuator and in the opposite direction to initiate exhaust of fluid from said actuator, the rate of fluid delivery to and exhaust of fluid from the actuator increasing progressively as said plunger is shifted farther from said neutral position, a spring biased control plunger supported on the tractor and having a connection through one of the hitch links with the implement and adapted to be displaced in direct proportion to changes in the draft load on the implement, a motion transmitting linkage interposed between said control plunger and said valve plunger, said linkage including a pair of interconnected elements adjustable to vary the motion transmitting effectiveness of the linkage and thereby determine the extent of shifting of the valve plunger for any predetermined displacement of the control plunger, and means operable manually to adjust said element.

References Cited in the file of this patent
UNITED STATES PATENTS

| | | |
|---|---|---|
| 2,118,180 | Ferguson | May 24, 1938 |
| 2,118,181 | Ferguson | May 24, 1938 |
| 2,356,231 | Ferguson | Aug. 22, 1944 |
| 2,437,875 | Chambers et al. | Mar. 16, 1948 |
| 2,460,847 | Schwarz | Feb. 8, 1949 |
| 2,515,637 | Dooley et al. | July 18, 1950 |
| 2,624,257 | Brock | Jan. 6, 1953 |